United States Patent
Nagao et al.

(10) Patent No.: US 11,315,212 B2
(45) Date of Patent: Apr. 26, 2022

(54) IMAGE PROCESSING APPARATUS, IMAGE PROCESSING METHOD, AND COMPUTER READABLE MEDIUM FOR EXECUTING PARTIAL PROCESSES ON IMAGE-SECTION DATA ITEMS

(71) Applicants: FUJIFILM BUSINESS INNOVATION CORP., Tokyo (JP); FUJIFILM Corporation, Tokyo (JP)

(72) Inventors: Takashi Nagao, Yokohama (JP); Kazuyuki Itagaki, Ashigarakami-gun (JP)

(73) Assignees: FUJIFILM Business Innovation Corp., Tokyo (JP); FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/010,950

(22) Filed: Sep. 3, 2020

(65) Prior Publication Data
US 2020/0402197 A1    Dec. 24, 2020

Related U.S. Application Data

(63) Continuation of application No. PCT/JP2019/000094, filed on Jan. 7, 2019.

(30) Foreign Application Priority Data

Sep. 18, 2018 (JP) .............................. JP2018-173740

(51) Int. Cl.
G06T 1/20 (2006.01)
(52) U.S. Cl.
CPC ..................................... G06T 1/20 (2013.01)

(58) Field of Classification Search
CPC .. G06T 1/20; G06F 9/5033; G06F 2209/5017
(Continued)

(56) References Cited

U.S. PATENT DOCUMENTS

2019/0019269 A1    1/2019   Itagaki et al.

FOREIGN PATENT DOCUMENTS

| JP | 4965995 B2 | 7/2012 |
| WO | 2017/163592 A1 | 9/2017 |

OTHER PUBLICATIONS

Uchi et al.; A new job migration scheduling for parallel program on grids; IPSJ SIG Technical Report; 2005; pp. 27-32; vol. 2005, No. 57.

(Continued)

*Primary Examiner* — Jacinta M Crawford
(74) *Attorney, Agent, or Firm* — Oliff PLC

(57) ABSTRACT

An image processing apparatus for executing partial processes on each of plural image-section data items, corresponding to plural image sections obtained by dividing an input image into partial regions, in each object of an object group in which plural objects for executing image processing is connected in a directed acyclic graph form, the image processing apparatus includes a processor configured to: assign dependency relationships to the partial processes between the objects; assign a priority to a partial process of an object arranged in a terminal stage of the object group; assign, as a priority of a partial process of an object arranged at a pre-stage side which has at least one partial process that is connected at a post-stage side and that has the dependency relationship assigned, a largest value of the priority; and execute a partial process having become executable according to the dependency relationship, according to the priority.

18 Claims, 18 Drawing Sheets

(58) Field of Classification Search
USPC .......................................................... 345/501
See application file for complete search history.

(56) References Cited

OTHER PUBLICATIONS

Gautam et al.; The OpenVX™ Specification Version 1.0.1; Kronos Group; 2014.
Belyakov et al.; Deferred Mode Image Processing Framework: Simple and Efficient Use of Intel® Multi-Core Technology and Many-Core Architectures with Intel® Integrated Performance Primitives; Intel® Developer Zone; 2010; http://web.archive.org/web/20150605173019/https://software.intel.com/en-us.
Jan. 29, 2019 Search Report issued in International Patent Application No. PCT/JP2019/000094.
Jan. 29, 2019 Written Opinion of the International Searching Authority issued in International Patent Application No. PCT/JP2019/000094.

|  | LARGEST VALUE OF EXECUTABLE PRIORITIES | EXECUTABLE PARTIAL PROCESS | THE SAME PRIORITY | | PRIORITY - 1 | | PRIORITY - 2 | |
|---|---|---|---|---|---|---|---|---|
| TIME POINT | | | EXECUT-ABLE | NON-EX-ECUTA-BLE | EXECUT-ABLE | NON-EX-ECUTA-BLE | EXECUT-ABLE | NON-EX-ECUTA-BLE |
| t0 | 10 | T11 | ▓ | | | | | |
| | | T12 | 0 | | | | | |
| | | T13 | 0 | | | | | |
| | | T14 | 0 | | | | | |
| t1 | 10 | T12 | 0 | 1 | ▓ | | | |
| | | T13 | 0 | 1 | 0 | | | |
| | | T14 | 0 | 1 | 0 | | | |
| | | T31 | 0 | 1 | 0 | | | |
| t2 | 10 | T13 | 0 | 1 | 0 | 0 | ▓ | |
| | | T14 | 0 | 1 | 0 | 0 | 0 | |
| | | T31 | 0 | 1 | 0 | 0 | 0 | |
| t3 | 10 | T14 | ▓ | | | | | |
| | | T31 | 0 | | | | | |
| t4 | 10 | T31 | 0 | 1 | 0 | 0 | | |
| | | T21 | 0 | 1 | 0 | ▓ | | |
| t5 | 10 | T31 | | | | | | |
| t6 | 10 | T41 | | | | | | |
| t7 | 9 | T32 | | | | | | |
| t8 | 9 | T42 | | | | | | |
| t9 | 8 | T33 | | | | | | |
| t10 | 8 | T43 | | | | | | |
| t11 | 7 | T34 | | | | | | |
| t12 | 7 | T44 | | | | | | |

▓ SELECTED ITEM

FIG. 17

| TIME POINT | LARGEST VALUE OF EXECUTABLE PRIORITIES | EXECUTABLE PARTIAL PROCESS | THE SAME PRIORITY | | INCREASE OR DECREASE IN THE AMOUNT OF MEMORY |
|---|---|---|---|---|---|
| | | | EXECUTABLE | NON-EXECUTABLE | |
| t0 | 10 | T11 | 1 | | |
| | | T31 | 0 | | |
| | | T32 | 0 | | |
| t1 | 10 | T21 | 0 | 1 | 0 |
| | | T31 | 0 | 1 | 2 |
| | | T32 | 0 | 1 | 2 |
| t2 | 10 | T31 | 0 | 1 | 2 |
| | | T32 | 0 | 1 | 2 |
| t3 | 10 | T32 | | | |
| t4 | 10 | T41 | | | |
| t5 | 10 | T51 | | | |
| t6 | 9 | T33 | | | |
| t7 | 9 | T42 | | | |
| t8 | 9 | T52 | | | |
| t9 | 8 | T12 | 1 | 0 | 1 |
| | | T34 | 1 | 0 | 2 |
| t10 | 8 | T22 | 0 | | |
| | | T34 | 1 | | |
| t11 | 8 | T22 | 0 | 1 | 0 |
| | | T43 | 0 | 1 | 0 |
| t12 | 8 | T43 | | | |
| t13 | 8 | T53 | | | |
| t14 | 7 | T44 | | | |
| t15 | 7 | T54 | | | |

▨ SELECTED ITEM

IMAGE PROCESSING APPARATUS, IMAGE PROCESSING METHOD, AND COMPUTER READABLE MEDIUM FOR EXECUTING PARTIAL PROCESSES ON IMAGE-SECTION DATA ITEMS

CROSS-REFERENCE TO RELATED APPLICATIONS

This is a continuation of International Application No. PCT/JP2019/000094 filed on Jan. 7, 2019, and claims priority from Japanese Patent Application No. 2018-173740 filed on Sep. 18, 2018.

BACKGROUND

Technical Field

The present invention relates to an image processing apparatus, an image processing method, and a computer readable medium.

Related Art

A technology for executing image processing according to an object group in which objects for executing image processing are connected in a directed acyclic graph (DAG) form is known (see WO2017/163592). In this technology, partial processes are executed respectively on image-section data items obtained by dividing an input image represented by input image data into partial regions, by each object. Also, in this technology, process dependency relationships are assigned between the partial processes of connected objects. Further, in this technology, priorities are assigned in order from a partial process of an object arranged on the pre-stage side of the DAG, and the partial processes are executed according to the assigned priorities.

SUMMARY

In the technology disclosed in WO2017/163592, partial processes may not necessarily be executed in the order in which the processing efficiency of image processing decreases, and as a result, the processing efficiency of image processing may decrease.

Aspects of non-limiting embodiments of the present disclosure relate to an image processing apparatus, an image processing method, and a computer readable medium storing a program capable of suppressing reduction in the processing efficiency of image processing as compared to the case of assigning priorities in order from a partial process of an object of the pre-stage side of a DAG.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus for executing partial processes on each of plural image-section data items, corresponding to plural image sections obtained by dividing an input image into partial regions, in each object of an object group in which plural objects for executing image processing is connected to one another in a directed acyclic graph form, the image processing apparatus including a processor configured to: assign dependency relationships to the partial processes between the objects connected; assign a priority to a partial process of an object arranged in a terminal stage of the object group; assign, as a priority of a partial process of an object arranged at a pre-stage side which has at least one partial process that is connected at a post-stage side and that has the dependency relationship assigned, a largest value of the priority assigned to the at least one partial process that is connected at the post-stage side and that has the dependency relationship assigned; and execute a partial process having become executable according to the dependency relationship, according to the priority assigned.

BRIEF DESCRIPTION OF DRAWINGS

Exemplary embodiment(s) of the present invention will be described in detail based on the following figures, wherein:

FIG. 17 is a view for explaining the order of execution of the individual partial processes of the image processing DAG shown in FIG. 16;

DETAILED DESCRIPTION

Prior to explanation of details of exemplary embodiments, matters to be considered in a method of assigning priorities in order from a partial process of an object of the pre-stage side of a DAG will be described in detail.

In the above-mentioned method, for example, higher priorities are assigned to partial processes of an object arranged on the post-stage side, than to partial processes of an object of the pre-stage side having a dependency relationship. Also, for example, to partial processes of an object of the post-stage side, priorities according to the priorities of partial processes of an object of the pre-stage side having a dependency relationship are assigned. This method may involve the following problems.

Figure 1:
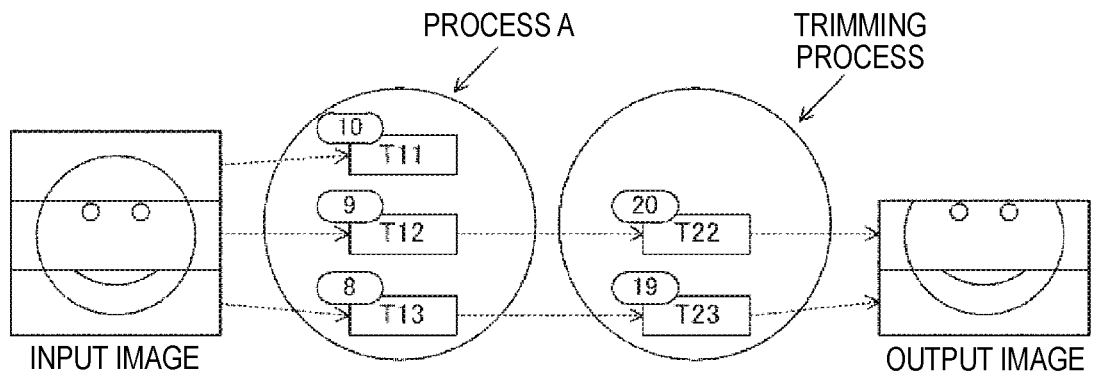
FIG. 1 is a view for explaining an example of matters relating to a method of assigning priorities in order from a partial process of an object of the pre-stage side of a DAG.

For example, the case of executing a trimming process on an input image after executing some image processing (described as "Process A" in FIG. 1) as shown in FIG. 1 is considered. In FIG. 1, rectangles having combinations of the letter "T" and numbers, such as T11, T12, etc., therein represent partial processes. Numbers provided on the upper left sides of the rectangles (for example, "10" provided with respect to "T11") represent priorities assigned to the partial processes.

In this case, as shown in FIG. 1, if priorities are assigned from the partial processes of the object of the pre-stage side, the trimming process is executed even on image sections unnecessary to obtain an output images by the partial process T11. Since the useless image processing is executed, the processing efficiency of image processing decreases. By the way, this problem is not limited to the trimming process, and may occur even in image processing which is executed on a part of an image.

Figure 2:
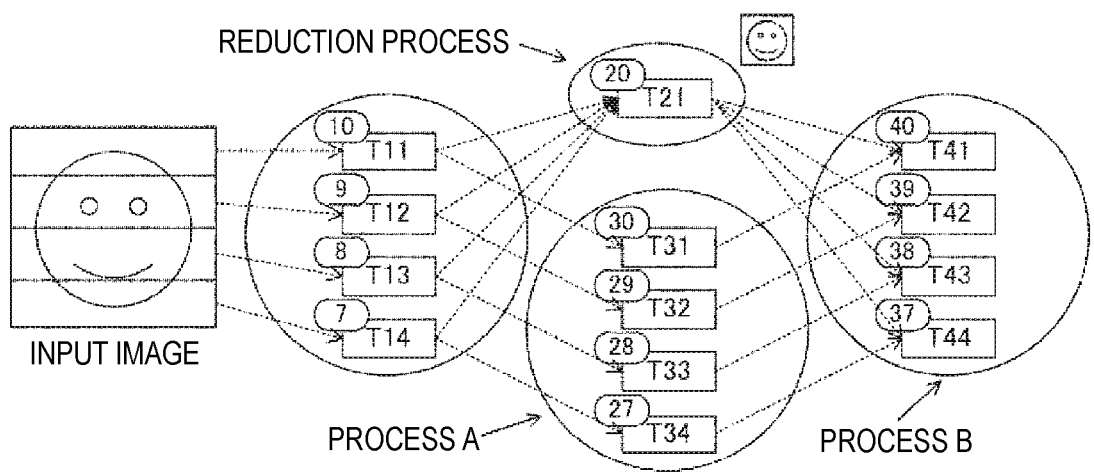
FIG. 2 is a view for explaining an example of matters relating to the method of assigning priorities in order from a partial process of an object of the pre-stage side of a DAG.

Next, the case where an object for executing one partial process (T21 in the example of FIG. 2) on a whole image, such as a reduction process, is included in a DAG as shown in FIG. 2 is considered. In this case, if priorities are assigned from the partial processes of an object of the pre-stage side, individual partial processes T41 to T44 of Process B cannot start unless the reduction process (i.e. the partial process T21) finishes. For this reason, when it becomes possible to execute Process B, output images of individual partial processes T31 to 34 of Process A are stored in a memory.

In contrast with this, for example, if a higher priority is assigned to the partial process T21 than to the partial processes T31 to T34, the partial processes of Process A and Process B are executed in the order of T31, T41, T32, T42, etc. Therefore, for example, when the partial process T41 finishes, the output memory for the partial process T31 (i.e. the input memory for the partial process T41) is released, so that memory consumption decreases. Therefore, reduction in the processing efficiency of image processing is suppressed.

Figure 3:
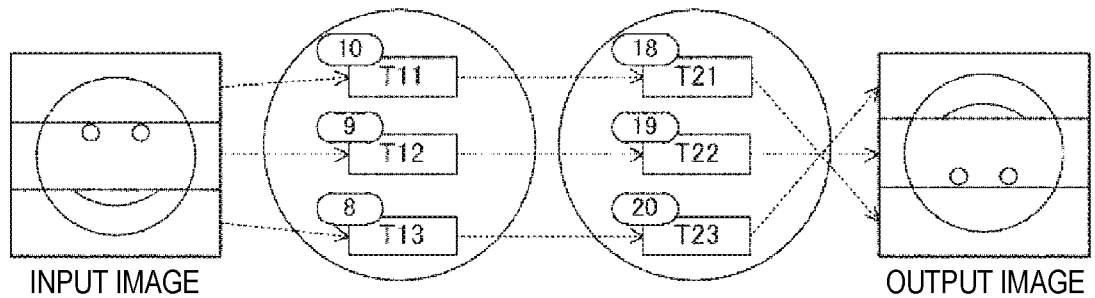
FIG. 3 is a view for explaining an example of matters relating to the method of assigning priorities in order from a partial process of an object of the pre-stage side of a DAG.

Next, the case where an object for executing image processing to flip an input image vertically as seen in a front view is connected after an object for executing image processing without flipping the input image vertically as seen in a front view is considered. In general, since display of an image on a display unit and formation of an image on a recording material such as paper are often executed by raster scanning, it is often preferable that an output image should be output sequentially from the top as seen in a front view. In the case of assigning priorities from the partial processes of the object of the pre-stage side, even if high priorities are assigned to the object for executing image processing to flip the image vertically as seen in a front view, in order from a partial process of processing an image section to be positioned on the upper side of an output image as seen in a front view, the problem occurs. In other words, in the example of FIG. 3, since the partial processes are executed in the order of the partial processes T11, T21, T12, T22, T13, and T23, an output image is output sequentially from the bottom as seen in a front view.

Figure 4:
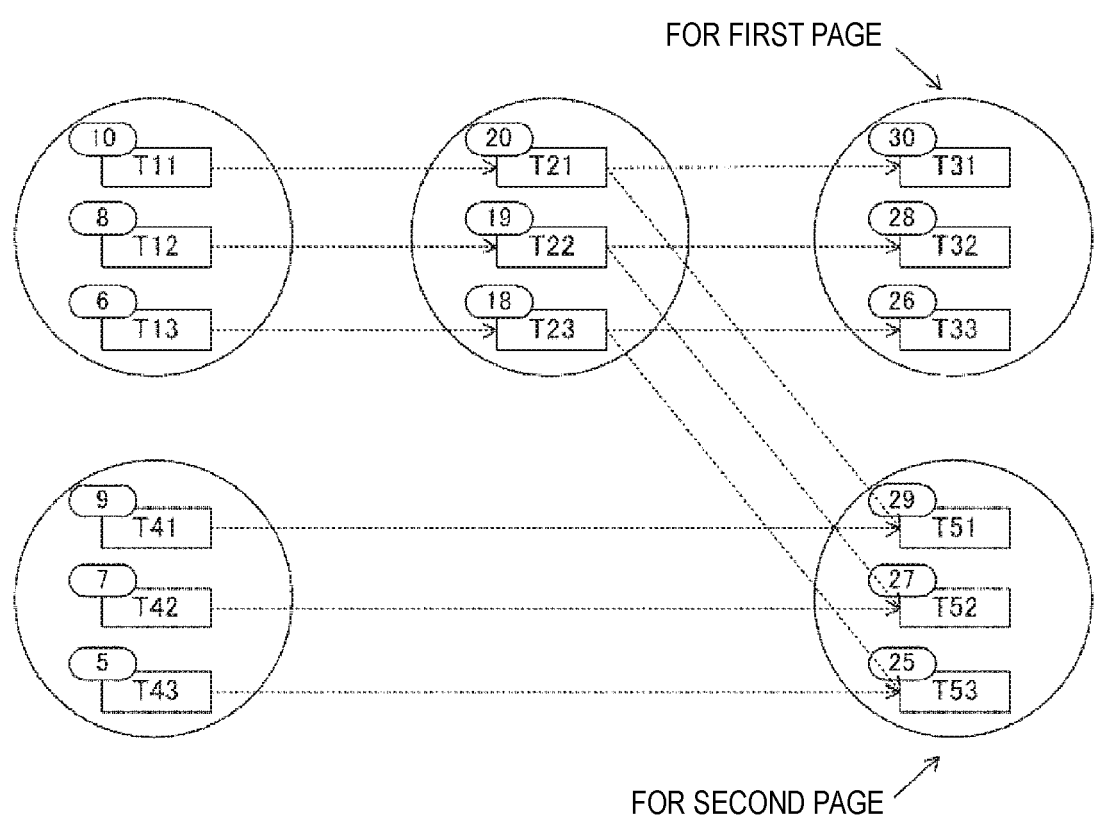
FIG. 4 is a view for explaining an example of matters relating to the method of assigning priorities in order from a partial process of an object of the pre-stage side of a DAG.

Next, the case where the number of objects arranged in the terminal stage of a DAG is two or more (in the example of FIG. 4, two) as shown in FIG. 4 is considered. In this case, in the above-mentioned method, in order to save memory consumption, the partial processes are executed in turn between the objects arranged in the terminal stage. In the example of FIG. 4, the partial processes are executed in the order of the partial processes T31, T51, T32, T52, T33, and T53. Therefore, for example, in the case where output images of the plural objects arranged in the terminal stage are a group of images of plural pages, it is preferable that an image of the first page and an image of the second page should be output as output images in the order of pages. In the above-mentioned method, in this case, the output images may not be output in the preferable order.

In order to address the above-described matters in the following exemplary embodiment, priorities are assigned to partial processes of objects arranged in the terminal stage of a DAG, such that to each partial process of an object arranged on the pre-stage side, the largest value of the priorities of the partial processes of an object arranged on the post-stage side and having a dependency relationship with respect to the corresponding partial process is propagated. Hereinafter, the exemplary embodiment for carrying out the present invention will be described in detail with reference to the drawings.

Figure 5:
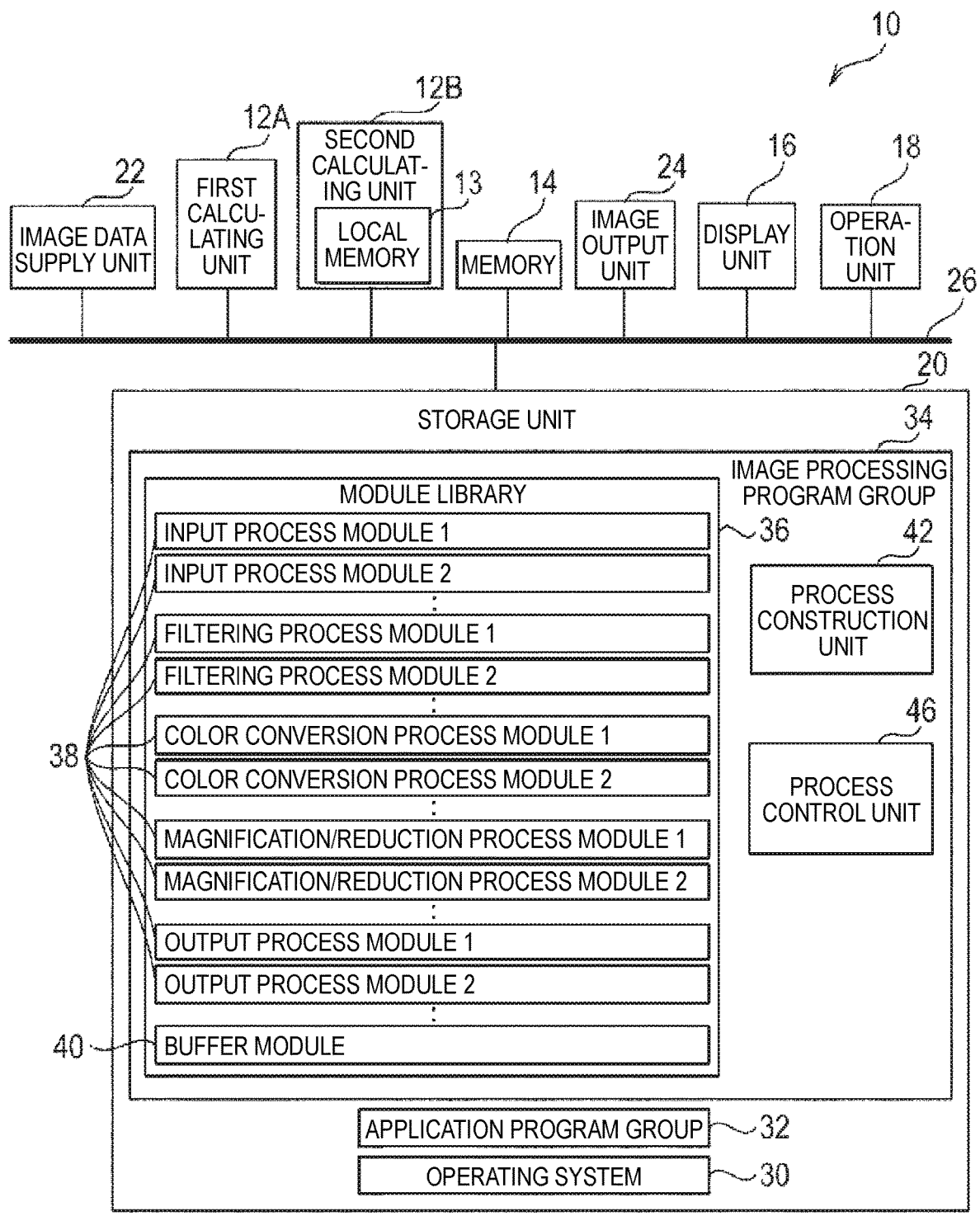
FIG. 5 is a block diagram illustrating an example of the configuration of a computer serving as an image processing apparatus according to an exemplary embodiment.

With reference to FIG. 5, the configuration of a computer 10 serving as an image processing apparatus will be described. The computer 10 may be a computer incorporated in an image handling device for executing image processing inside a copy machine, a printer, a facsimile apparatus, a multi-function apparatus having the functions of those apparatuses, a scanner, or the like. Also, the computer 10 may be an independent computer such as a personal computer (PC), or may be a computer incorporated in a portable device such as a personal digital assistant (PDA), a mobile phone, or the like.

As shown in FIG. 5, the computer 10 according to the present exemplary embodiment includes a first calculating unit 12A, a second calculating unit 12B, a memory 14, a display unit 16, an operation unit 18, a storage unit 20, an image data supply unit 22, and an image output unit 24. Further, the first calculating unit 12A, the second calculating unit 12B, the memory 14, the display unit 16, the operation unit 18, the storage unit 20, the image data supply unit 22, and the image output unit 24 are connected to one another through a bus 26.

The first calculating unit 12A according to the present exemplary embodiment is a main processor of the computer 10, and is, for example, a central processing unit (CPU) having plural processor cores (hereinafter, referred to as "cores"). The second calculating unit 12B according to the present exemplary embodiment is, for example, a graphics processing unit (GPU) having a local memory 13 therein. However, the second calculating unit 12B may be the same type of CPU as the first calculating unit 12A, or may be a different type of CPU. The second calculating unit 12B may be a GPU incorporated in the first calculating unit 12A. The second calculating unit 12B may be a GPU having no local memory 13 therein. The first calculating unit 12A and the second calculating unit 12B may be calculators such as field programmable gate arrays (FPGAs).

The memory 14 is a non-volatile storage means where the first calculating unit 12A and the second calculating unit 12B temporarily store data. In the case of executing image processing by the second calculating unit 12B according to the present exemplary embodiment, the first calculating unit 12A transmits image data stored in a storage area of the memory 14 or the storage unit 20 to the second calculating unit 12B through the bus 26. The second calculating unit 12B stores the image data transmitted from the first calculating unit 12A, in the local memory 13, and executes image processing on the stored image data. By the way, the second calculating unit 12B may read image data directly from the memory 14 or the storage unit 20, and execute image processing on the image data.

In the case where the computer 10 is incorporated in the above-mentioned image handling device, as the display unit 16 and the operation unit 18, for example, a display panel such as a liquid crystal display (LCD), a numeric keypad, and the like, provided in the image handling device may be employed. In the case where the computer 10 is an independent computer, as the display unit 16 and the operation unit 18, for example, a display, a keyboard, a mouse, and the like connected to the computer 10 may be employed. Also, the display unit 16 and the operation unit 18 may be a touch panel display or the like configured by integrating a touch panel and a display. As the storage unit 20, non-volatile storage media such as a hard disk drive (HDD), a solid state drive (SSD), and a flash memory may be employed.

The image data supply unit 22 needs only to be a unit configured to supply image data which are processing targets, and for example, an image reading unit for reading images recorded on recording materials such as paper and photographic films and outputting image data may be employed. As the image data supply unit 22, for example, a receiving unit for receiving image data from external devices through a communication line, an image storage unit (the memory 14 or the storage unit 20) for storing image data, and so on may be employed.

The image output unit 24 needs only to be a unit configured to output image data subjected to image processing or images represented by image data subjected to image processing, and for example, an image recording unit for recording images represented by image data on recording materials such as paper or photosensitive materials may be employed. Also, as the image output unit 24, a display unit (the display unit 16) for displaying images represented by image data on a display or the like, or a writing device for writing image data on recording media such as a compact disc read only memory (CD-ROM) may be employed. Also, as the image output unit 24, a transmitting unit for transmitting image data subjected to image processing to external devices through a communication line may be employed. Also, the image output unit 24 may be an image storage unit (the memory 14 or the storage unit 20) for storing image data subjected to image processing.

As shown in FIG. 5, in the storage unit 20, various programs which is executable by the first calculating unit 12A and the second calculating unit 12B are stored in advance. In the storage unit 20, as a part of the various programs, programs of an operating system 30 for performing management of resources, management of execution of programs, communication between the computer 10 and external devices, and so on are stored in advance. Further, in the storage unit 20, as a part of the various programs, an image processing program group 34 for making the computer 10 function as an image processing apparatus is stored in advance. Furthermore, in the storage unit 20, as a part of the various programs, a group 32 consisting of various application programs (hereinafter, referred to as the "application 32") for making the above-mentioned image processing apparatus execute desired image processing is stored in advance.

The image processing program group 34 is programs developed for reducing burden when developing image processing programs which is executable by the above-mentioned image handling device, mobile phones, PCs, and the like. Also, the image processing program group 34 is programs developed to be commonly executable in various devices (platforms) such as the above-mentioned image handling device, mobile phones, PCs, and the like.

The image processing apparatus which is realized by the image processing program group 34 constructs an image processing DAG 50A (whose details will be described below) for executing image processing instructed by the application 32 in accordance with a construction instruction from the application 32. The above-mentioned image processing apparatus executes processing of the image processing DAG 50A in accordance with an execution instruction from the application 32. To this end, the image processing program group 34 provides an interface for giving an instruction to construct the image processing DAG 50A for executing desired image processing or giving an instruction to execute image processing according to the constructed image processing DAG 50A, to the application 32.

In the case of newly developing an arbitrary device required to perform image processing therein, in the case of developing programs for executing the above-mentioned image processing, the application 32 for making the image processing program group 34 execute the image processing required to be executed in the above-mentioned arbitrary device through the above-mentioned interface may be developed. Therefore, developers do not need to newly develop programs for actually executing image processing. Therefore, the burden on the developers decreases.

Now, the image processing program group 34 according to the present exemplary embodiment will be described in detail. As shown in FIG. 5, the image processing program group 34 includes a module library 36, a program serving as a process construction unit 42, and a program serving as a process control unit 46.

In the module library 36, programs of plural types of image processing modules 38 for executing predetermined different types of image processing are registered individually in advance. Examples of this image processing include an input process, a filtering process, a color conversion process, a magnification or reduction process (referred to as "Magnification/Reduction Process" in FIG. 5), a skew angle detection process, an image rotation process, an image synthesis process, an output process, etc.

Further, in the module library 36, image processing modules 38 for executing image processing which are of the same type but are different in the contents of the image processing are registered in advance. In FIG. 5, such types of image processing modules are distinguished from each other, as "Modules 1" and "Modules 2" having numbers at the ends. For example, as an image processing module 38 for executing a magnification or reduction process, an image processing module 38 for executing a reduction process of reducing the vertical and horizontal sizes of images by 50% by thinning out input image data every other pixel in each of the horizontal direction and the vertical direction is prepared. Further, for example, as another image processing module 38 for executing a magnification or reduction process, an image processing module 38 for executing a magnification or reduction process at a magnification or reduction ratio designated for input image data is prepared.

Also, for example, as image processing modules 38 for executing color conversion processes, an image processing module 38 for converting images in an RGB (red, green, blue) color space into images in a CMYK (cyan, magenta, yellow, key-plate) color space, and an image processing module 38 for converting images in a CMYK color space into images in an RGB color space are prepared. Further, for example, as other image processing modules 38 for executing color conversion processes, an image processing module 38 for converting images in an RGB color space into images in a YCbCr color space, and an image processing module 38 for converting images in a YCbCr color space into images in an RGB color space are prepared.

In each of the image processing modules 38 according to the present exemplary embodiment, calculating-unit information representing which calculating unit of the first calculating unit 12A and the second calculating unit 12B is required to execute the corresponding image processing module 38 is included. By the way, the calculating-unit information may be set in advance according to at least one of the type and image processing content of each image processing module 38, or may be set according to an instruction from the application 32 when the process construction unit 42 (to be described below) constructs the image processing DAG 50A.

Also, in the module library 36, a buffer module 40 having a storage area (a buffer) for storing image data is registered.

The process construction unit 42 according to the present exemplary embodiment constructs the image processing DAG 50A in a DAG form according to an instruction from the application 32. In the image processing DAG 50A, for example, as shown in FIG. 6A, one or more image processing modules 38 are connected through the buffer module 40 arranged in at least one of the pre-stage and post-stage of each image processing module 38.

By the way, each image processing module 38 is an example of an object for executing image processing on input image data and outputting output image data. Also, the image processing DAG 50A is an example of an object group consisting of plural image processing modules 38 connected. Also, in the example shown in FIG. 6A, it is shown that each image processing module 38 having another image processing module 38 connected thereto through the buffer module 40 in the pre-stage thereof becomes able to execute its image processing in the case where image processing of another image processing module 38 arranged in the pre-stage finishes. Further, it is shown that each image processing module 38 having other plural image processing modules 38 connected thereto through the buffer module 40 in the pre-stage thereof becomes able to execute its image processing in the case where image processing of all of the other plural image processing modules 38 arranged in the pre-stage finishes.

Figure 6A:
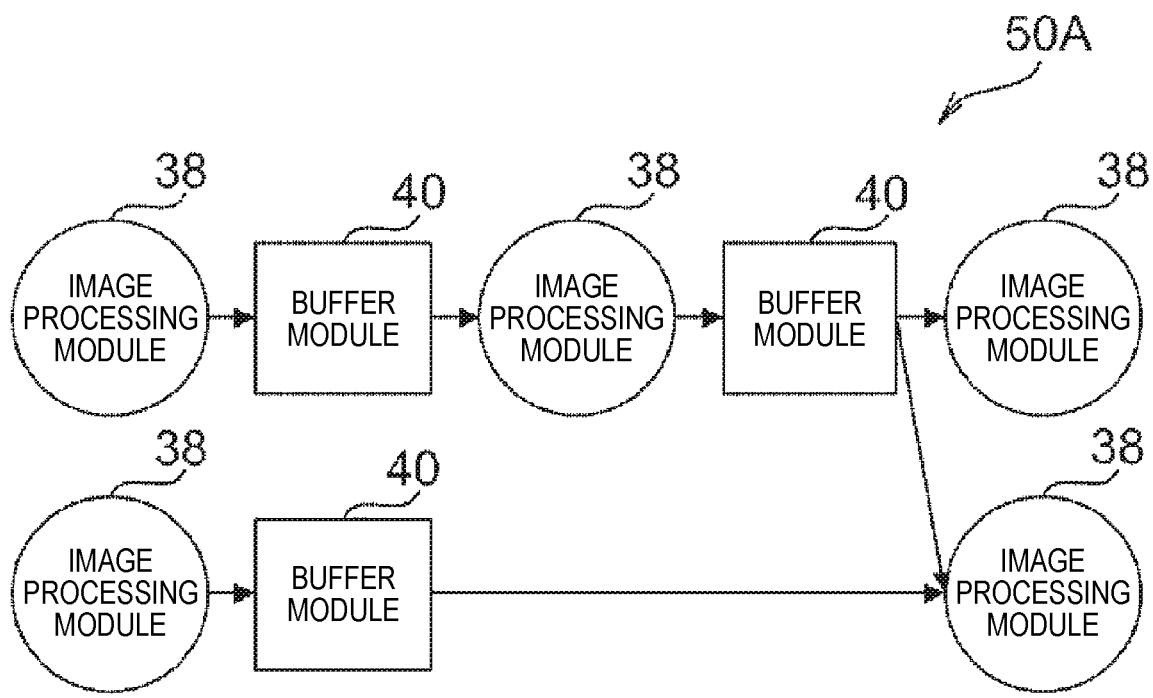
FIG. 6A is a schematic diagram illustrating an example of an image processing DAG.
Figure 6B:
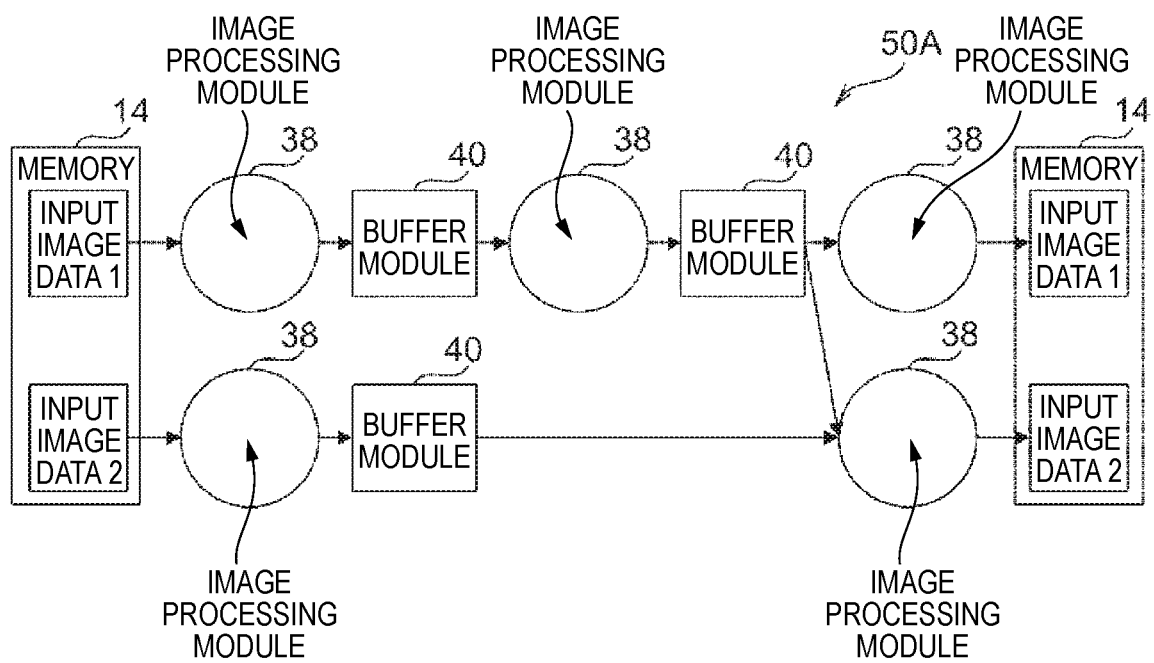
FIG. 6B is a schematic diagram illustrating an example of the case where the image processing DAG has memories for inputting or outputting additionally provided.

In FIG. 6A, a DAG in which only individual modules are connected in the processing order is shown; however, when this DAG is executed, as shown in FIG. 6B, image data stored in the memory 14 is input and image processing is executed according to the DAG. Finally, in the memory 14, processing results such as image data subjected to the processing are stored. By the way, in the case where image processing which needs to be executed by each image processing module 38 is executed by the second calculating unit 12B, the memory 14 shown in FIG. 6B becomes the local memory 13.

Figure 7:
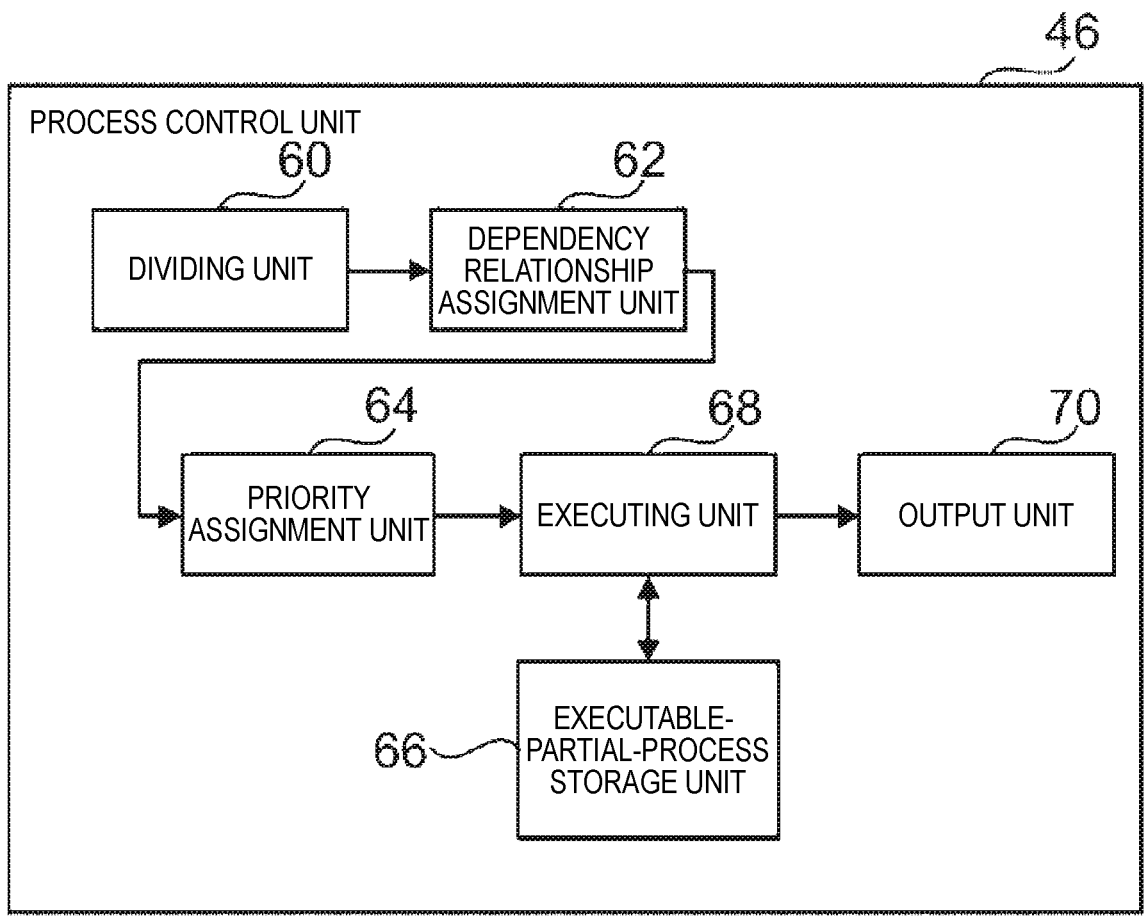
FIG. 7 is a block diagram illustrating an example of the functional configuration of a process control unit according to the exemplary embodiment.

Now, with reference to FIG. 7, the functional configuration of the process control unit 46 according to the present exemplary embodiment will be described. As shown in FIG. 7, the process control unit 46 includes a dividing unit 60, a dependency relationship assignment unit 62, a priority assignment unit 64, an executable-partial-process storage unit 66, an executing unit 68, and an output unit 70.

Figure 8A:
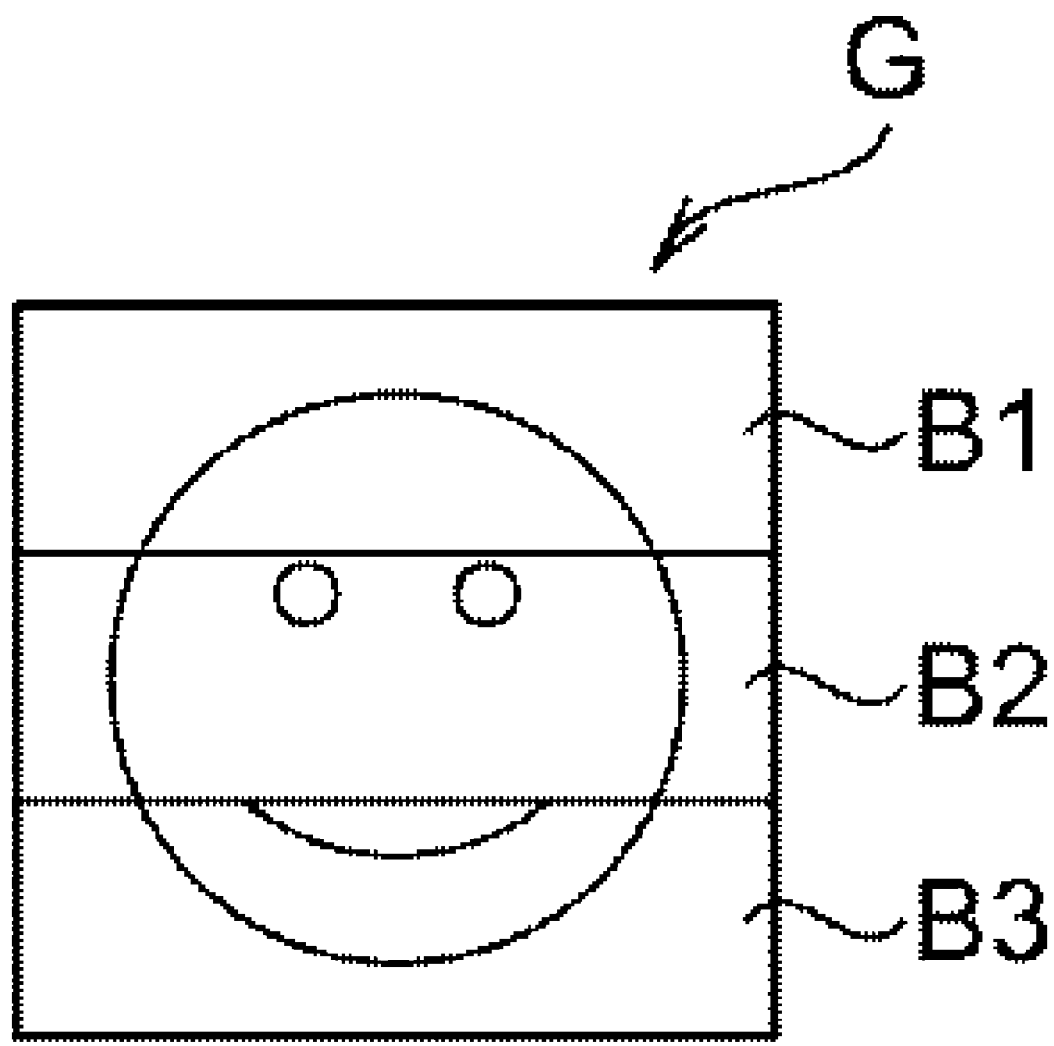
FIG. 8A is a schematic diagram for explaining an example of an input image dividing process.

The dividing unit 60 according to the present exemplary embodiment divides an image represented by a part of input image data which is a processing target into plural partial regions (hereinafter, referred to as "image sections"). For example, as shown in FIG. 8A, the dividing unit 60 divides an image G represented by a part of input image data which is a processing target into plural image sections B1 to B3 (in the example shown in FIG. 8A, three). Hereinafter, image data items representing image sections will be referred to as "image-section data items". In image processing in which the whole of an input image is a processing target, such as a color conversion process, a part of input image data which is a processing target means the whole of the input image data. In image processing in which a part of an input image is a processing target, such as a trimming process, a part of input image data which is a processing target means a part of the input image. Hereinafter, in order to avoid complication, a part of input image data which is a processing target is referred to simply as input image data.

Figure 8B:
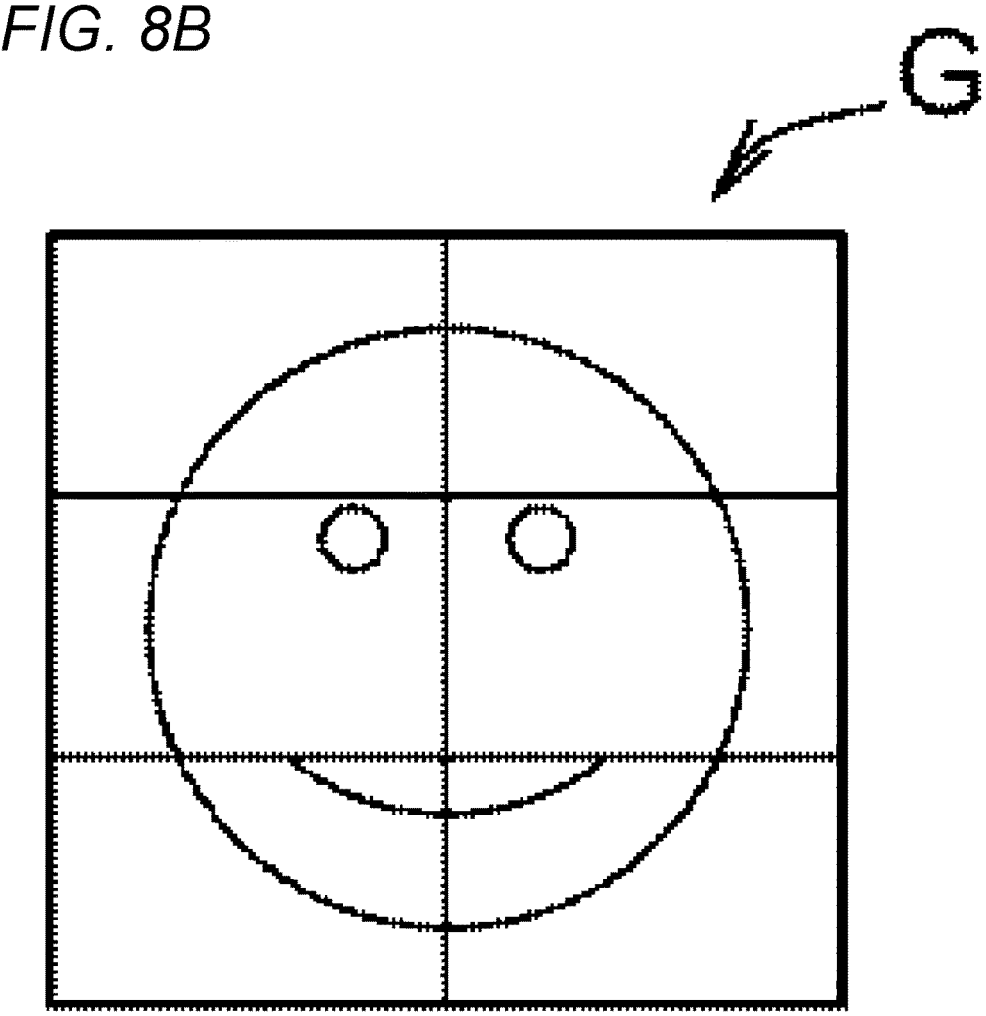
FIG. 8B is a schematic diagram for explaining an example of the input image dividing process.

In the example shown in FIG. 8A, the dividing unit 60 divides the image G into partial regions in the vertical direction as seen in a front view, but is not limited thereto. For example, the dividing unit 60 may divide the image G into partial regions in the horizontal direction as seen in a front view, or may divide the image into partial regions in the vertical direction and the horizontal direction as seen in a front view as shown in FIG. 8B.

The number of parts into which image data is divided by the dividing unit 60 is not particularly limited. For example, the dividing unit 60 may divide input image data into a predetermined number of parts, or in a predetermined size. Also, for example, the dividing unit 60 may divide input image data into parts such that the number of parts is equal to or larger than 2 and is equal to or smaller than the number of processor cores included in a calculating unit for executing image processing by an image processing module 38.

Also, for example, the dividing unit 60 may divide input image data in a size equal to or smaller than the capacity of a cache memory included in a calculating unit for executing image processing according to an image processing module 38. In this case, as an example of the dividing unit 60, a form for dividing input image data in a size which is equal to or smaller than the capacity of a cache memory at the level farthest from a processor of a calculating unit for executing image processing according to an image processing module 38, i.e. a so-called last level cache (LLC) and matches the capacity of the LLC to the utmost is taken.

Figure 9:
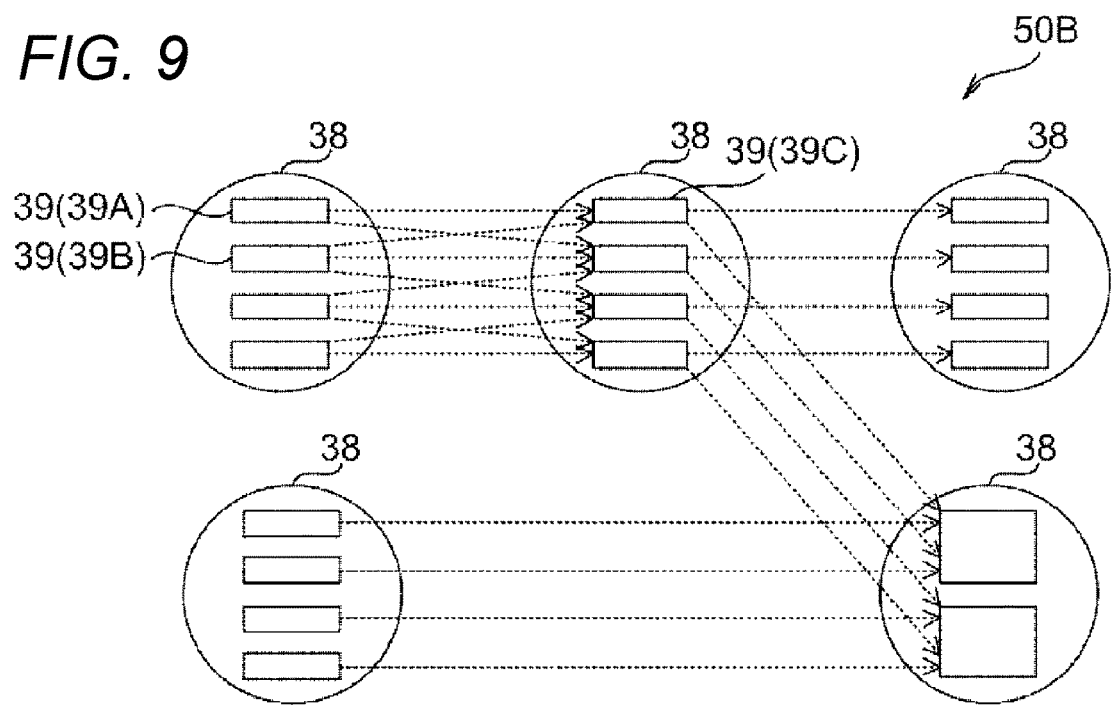
FIG. 9 is a schematic diagram illustrating an example of an image processing DAG in which each of image processing modules is divided to partial processes.

Also, for example, as shown in FIG. 9, the dividing unit 60 divides image processing which is executed by each image processing modules 38, into partial processes 39 (tasks) corresponding to image-section data items, respectively, with respect to the image processing DAG 50A, to construct an image processing DAG 50B. FIG. 9 shows an image processing DAG 50B which is obtained in the case where input image data is divided into four image-section data items in the image processing DAG 50A shown in FIG. 1. In FIG. 9, in order to avoid complication, the buffer module 40 is omitted. Further, similarly, in FIGS. 10A to 10D, FIGS. 11A to 11F, FIGS. 12 to 14, and FIG. 16 (to be described below), the buffer module 40 is omitted.

The dependency relationship assignment unit 62 according to the present exemplary embodiment assigns a dependency relationship between partial processes 39 of an image processing module 38 connected in the pre-stage and partial processes 39 of another image processing module 38 connected in the post-stage, according to the types of image processing to be executed by the image processing modules 38. In FIG. 9, this dependency relationship is shown by dashed arrows.

For example, a process of executing image processing only on pixels which are processing targets, such as a color conversion process, the individual partial processes 39 satisfy a one-to-one dependency relationship. Meanwhile, for example, in image processing which needs peripheral pixels of pixels which are processing targets, such as a filtering process, a dependency relationship is assigned even to the pre-stage partial processes 39 of executing image processing on the peripheral pixels. In other words, this dependency relationship is a relationship between connected image processing modules 38 in which in the case where the partial processes 39 of the image processing module 38 connected in the pre-stage finish, the partial processes 39 of the image processing module 38 connected in the post-stage become executable. Therefore, each partial process 39 becomes executable in the case where there is no partial process 39 connected thereto in the pre-stage and having a dependency relationship assigned, or in the case where all of partial processes 39 connected thereto in the pre-stage and having a dependency relationship assigned finish.

Specifically, for example, a partial process 39A and a partial process 39B shown in FIG. 9 become executable when execution of image processing according to the image processing DAG 50B starts. For example, a partial process 39C shown in FIG. 9 becomes executable in the case where processing of both of the partial process 39A and the partial process 39B arranged in the pre-stage and having a dependency relationship finish.

The priority assignment unit 64 according to the present exemplary embodiment assigns priorities representing the order of execution of partial processes 39, to each partial processes 39. The priority assignment unit 64 assigns larger values as higher priorities. In other words, in the present exemplary embodiment, in the case where plural partial processes 39 becomes executable at the same time, the partial processes are executed in order from a partial process 39 having the largest value assigned as the priority. However, the priority assignment unit 64 may assign smaller values as higher priorities. In this case, in the case where plural partial processes 39 becomes executable at the same time, the partial processes are executed in order from a partial process 39 having the smallest value assigned as the priority.

Specifically, the priority assignment unit 64 assigns priorities to the partial processes 39 of each image processing module 38 arranged at the terminal stage and having no image processing module 38 connected thereto in the post-stage, of the individual image processing modules 38 of the image processing DAG 50B, according to a predetermined assignment rule. This assignment rule may be fixed, or may be designated by a user, or be selected on the basis of system requirements and so on, from plural assignment rules.

In the present exemplary embodiment, the case where as an example of the assignment rule, a rule that in the case where the number of image processing modules 38 arranged in the terminal stage is one, the highest priority should be assigned to an image section positioned on the upper left side of an input image of the image processing module 38 arranged in the terminal stage as seen in a front view, and lower priorities should be assigned as it goes to the lower left side as seen in the front view is applied will be described. The reason is that in general, display of an image on a display unit, formation of an image on a recording material such as paper, transmission of image data through a network, and so on are often executed by raster scanning, so it is often preferable that an output image should be output sequentially from the top as seen in a front view.

Figure 10A:
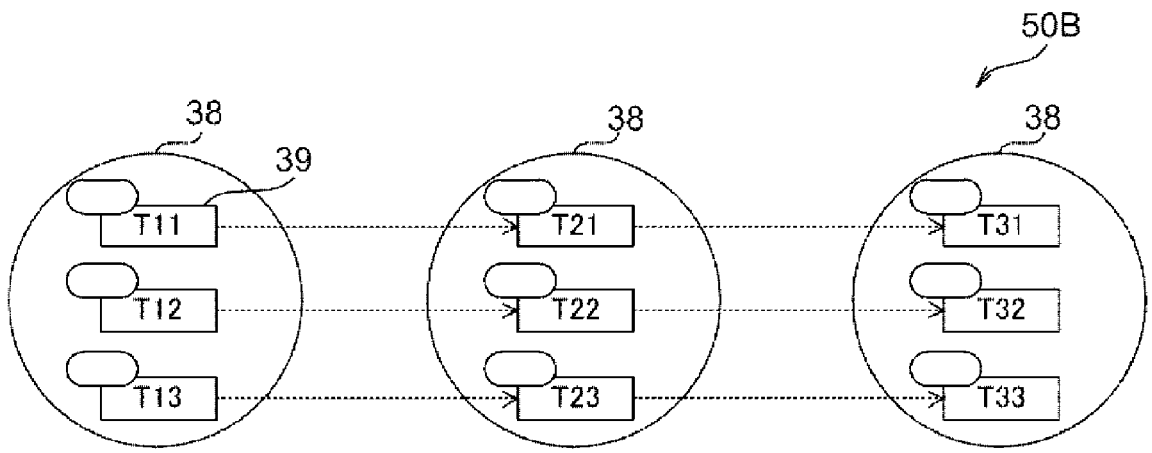
FIG. 10A is a view for explaining a process of assigning priorities to partial processes of an image processing DAG in which the number of image processing modules arranged in the terminal stage is one.
Figure 10B:
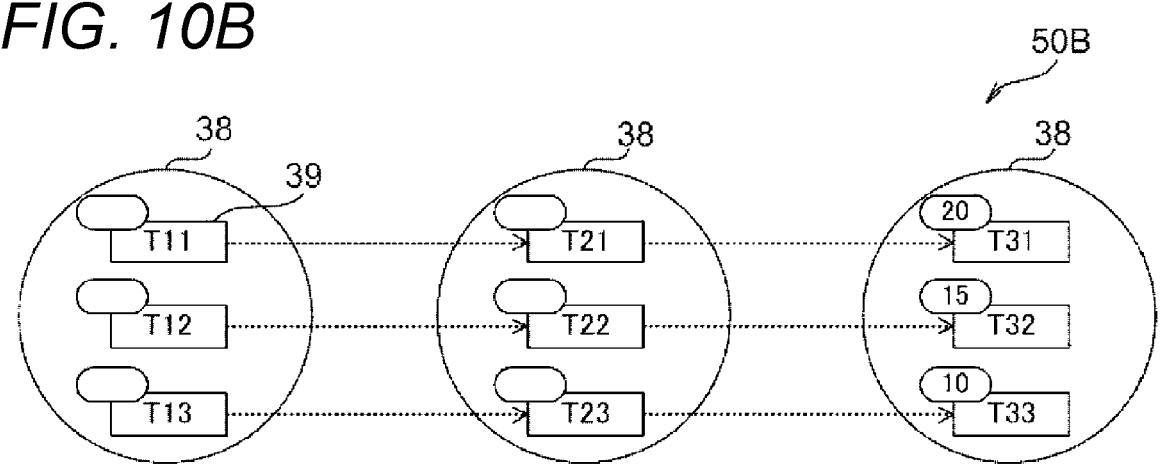
FIG. 10B is a view for explaining the process of assigning priorities to partial processes of an image processing DAG in which the number of image processing modules arranged in the terminal stage is one.

An example in which priorities have been assigned to the partial processes 39 of the image processing module 38 arranged in the terminal stage of the image processing DAG 50B shown in FIG. 10A in accordance with the above-mentioned assignment rule is shown in FIG. 10B. By the way, character strings (such as "T11") in the individual partial processes 39 shown in FIGS. 10A and 10B are character strings for distinguishing the individual partial processes 39, and hereinafter, in the case of distinctively describing the individual partial processes 39, they will be described with the internal character strings added to their ends, like the partial process T11. Also, numbers (such as "10") on the upper left sides of the partial processes 39 shown in FIG. 10B represent the priorities assigned to the individual partial processes 39. Further, with respect to the partial processes 39 of FIGS. 10A and 10B, the partial processes 39 having no numbers on the upper left sides represent partial processes 39 having no priorities assigned. By the way, the internal character strings and priorities of the partial processes 39 described taking FIGS. 10A and 10B as examples are true for FIGS. 10C and 10D, FIGS. 11A to 11F, FIGS. 12 to 14, and FIG. 16 (to be described below).

In the example of FIG. 10, the priority assignment unit 64 assigns a higher priority to a partial process 39 of processing an image-section data item representing an image section to be positioned on the upper side of an output image as seen in a front view than to a partial process 39 of processing an image-section data item representing an image section to be positioned on the lower side of the output image as seen in the front view. By the way, it is assumed that in the example of FIG. 10B, the positions of the partial processes 39 correspond to the positions of the output image as seen in the front view. In other words, in the example of FIG. 10B, the priority assignment unit 64 assigns priorities such that the priorities decrease in the order of the partial processes T31, T32, and T33. In this case, the values of the priorities may be any values as long as it is possible to determine whether each priority is high or low. Therefore, the values of the priorities may not be an arithmetic progression with common difference, unlike FIG. 10B, or may be negative values.

Also, in the present exemplary embodiment, in the case where the number of image processing modules 38 arranged in the terminal stage of the image processing DAG 50B is two or more, the following two assignment rules may be selected.

The first assignment rule is a rule that priorities should be assigned such that image processing is executed sequentially in units of an image processing module 38. According to this rule, in the case where output images of the plural image processing modules 38 arranged in the terminal stage are a group of images of plural pages, the output images are output in page order. An example in which priorities have been assigned to the partial processes 39 of the image processing modules 38 arranged in the terminal stage of the image processing DAG 50B shown in FIG. 11A according to the first assignment rule is shown in FIG. 11B.

Figure 11A:
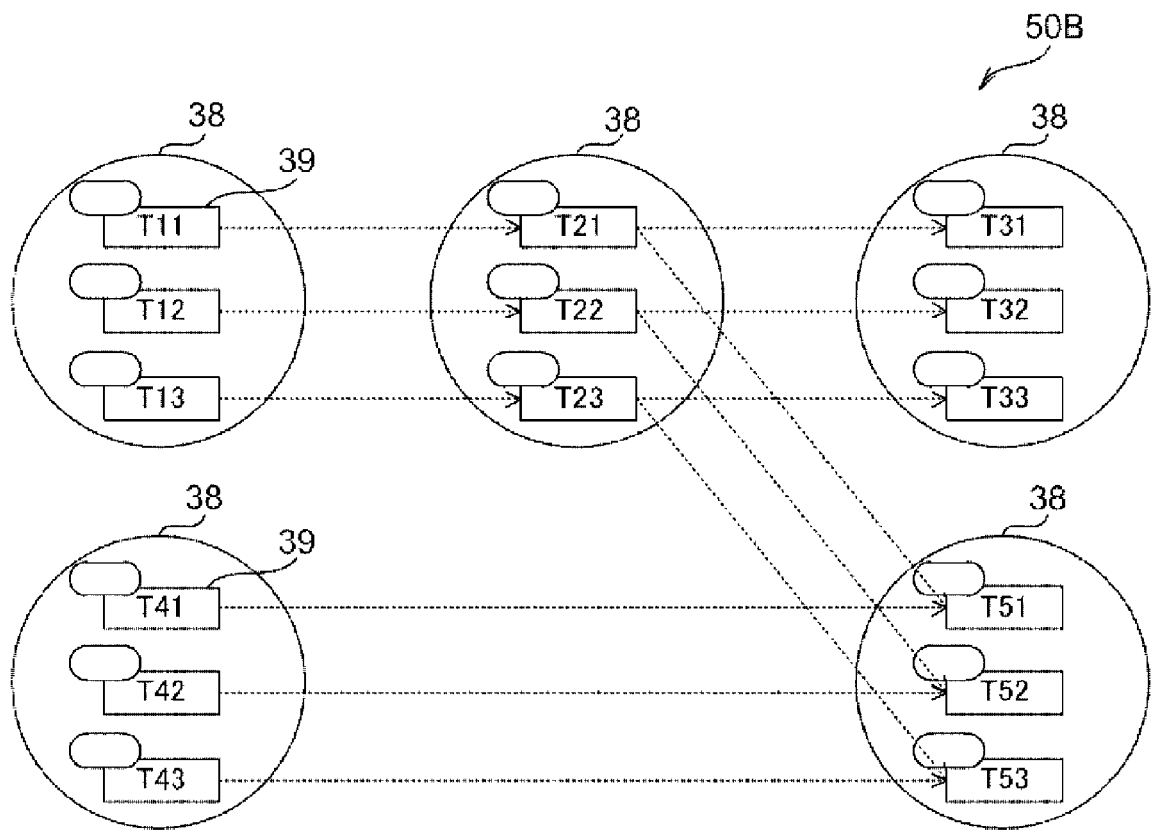
FIG. 11A is a view for explaining a process of assigning priorities to partial processes of an image processing DAG in which the number of image processing modules arranged in the terminal stage is two or more.
Figure 11B:
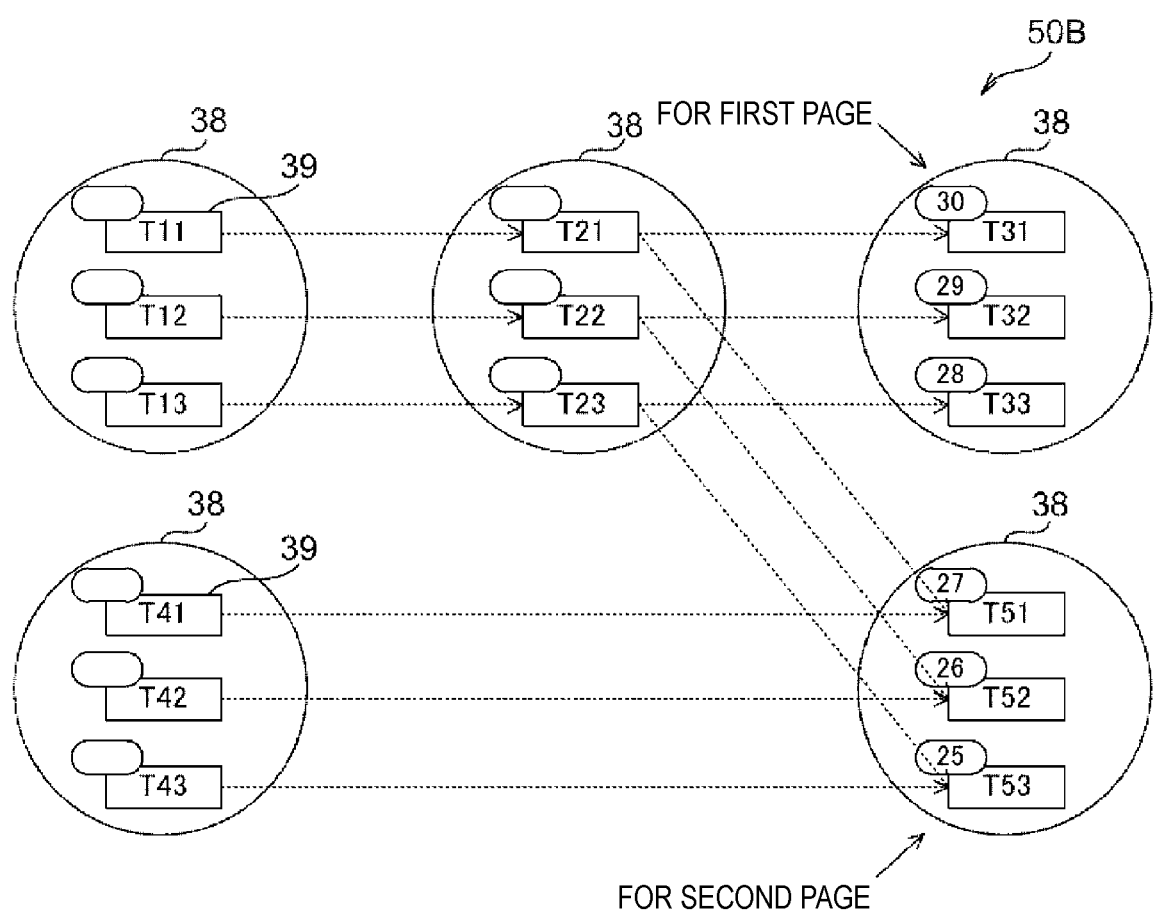
FIG. 11B is a view for explaining the process of assigning priorities to partial processes of an image processing DAG in which the number of image processing modules arranged in the terminal stage is two or more.

As shown in FIG. 11B, according to the first assignment rule, higher priorities are assigned to the partial processes 39 of an image processing module 38 configured to output an output image having a smaller page number. By the way, for example, a rule for assigning priorities to individual partial processes 39 included in each image processing module 38 may be the same as the above-mentioned assignment rule.

The second assignment rule is a rule that priorities should be assigned such that the partial processes 39 of the individual image processing modules 38 are executed in turn among the image processing modules 38. An example in which priorities have been assigned to the partial processes 39 of the image processing modules 38 arranged in the terminal stage of the image processing DAG 50B shown in FIG. 11A in accordance with the second assignment rule is shown in FIG. 11C.

Figure 11C:
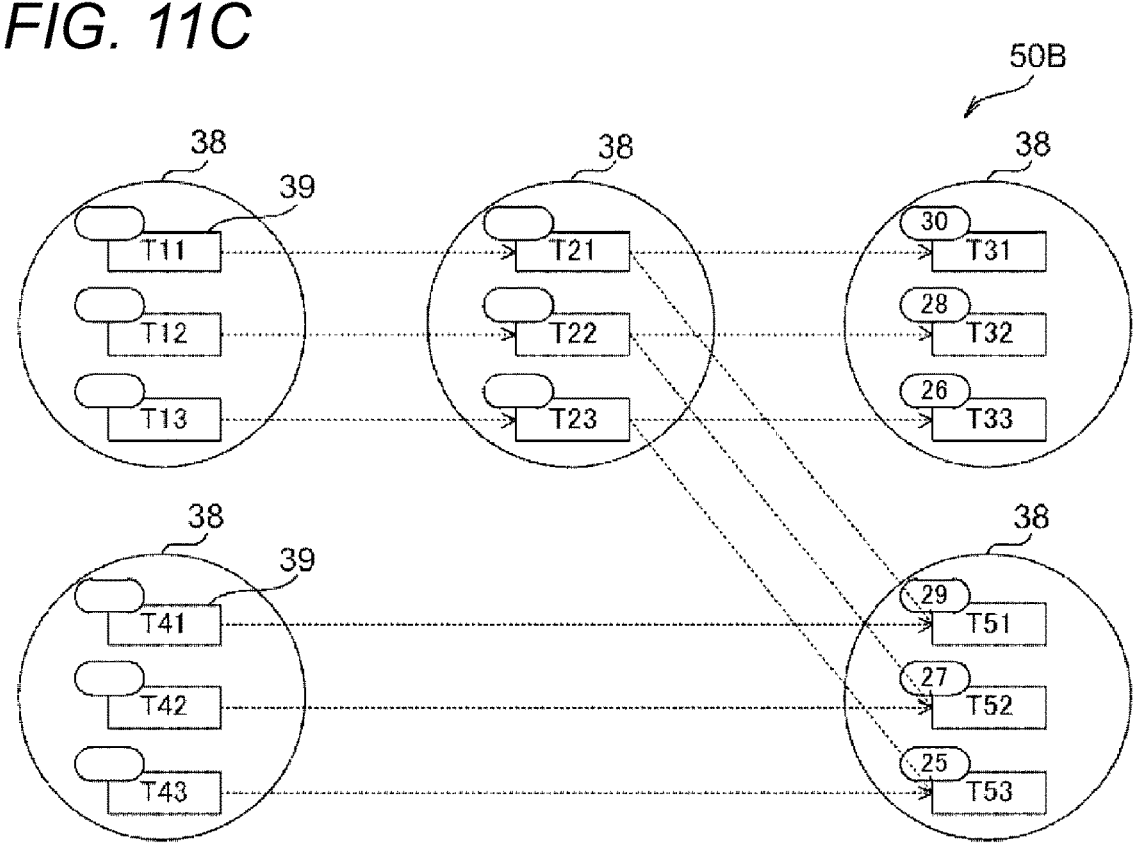
FIG. 11C is a view for explaining the process of assigning priorities to partial processes of an image processing DAG in which the number of image processing modules arranged in the terminal stage is two or more.

As shown in FIG. 11C, according to the second assignment rule, between the image processing modules 38 arranged in the terminal stage, the partial processes 39 of the individual image processing modules 38 are executed in turn. By the way, for example, a rule for assigning priorities to the partial processes 39 included in each image processing module 38 may be the same as the above-mentioned assignment rule. Also, which image processing module 38 should have higher priority among the plural image processing modules 38 arranged in the terminal stage is not particularly limited. For example, it may be random, or may be included in an image processing DAG construction instruction from the application 32.

If assignment of priorities to the partial processes 39 of each image processing module 38 arranged in the terminal stage finishes, the priority assignment unit 64 assigns priorities to the partial processes 39 of each image processing module 38 which is in the pre-stage and has a partial process 39 connected thereto in the post-stage and having a dependency relationship assigned. In the present exemplary embodiment, the priority assignment unit 64 assigns the largest value of the priorities of the partial processes 39 arranged on the post-stage side and having the dependency relationship assigned, as the priorities of the partial processes 39 of the image processing module 38 which is on the pre-stage side and has the partial processes 39 connected thereto on the post-stage side and having the dependency relationship assigned.

Figure 10C:
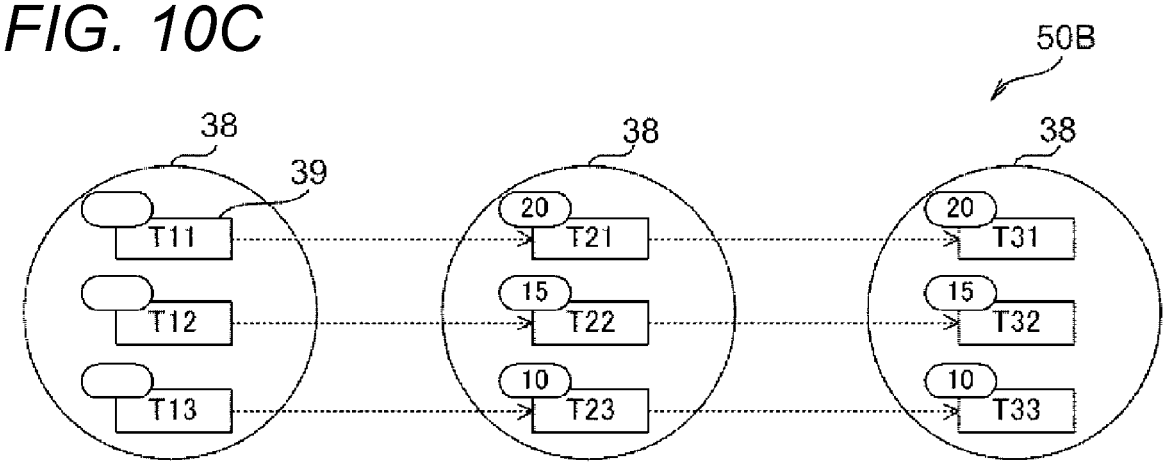
FIG. 10C is a view for explaining the process of assigning priorities to partial processes of an image processing DAG in which the number of image processing modules arranged in the terminal stage is one.
Figure 10D:
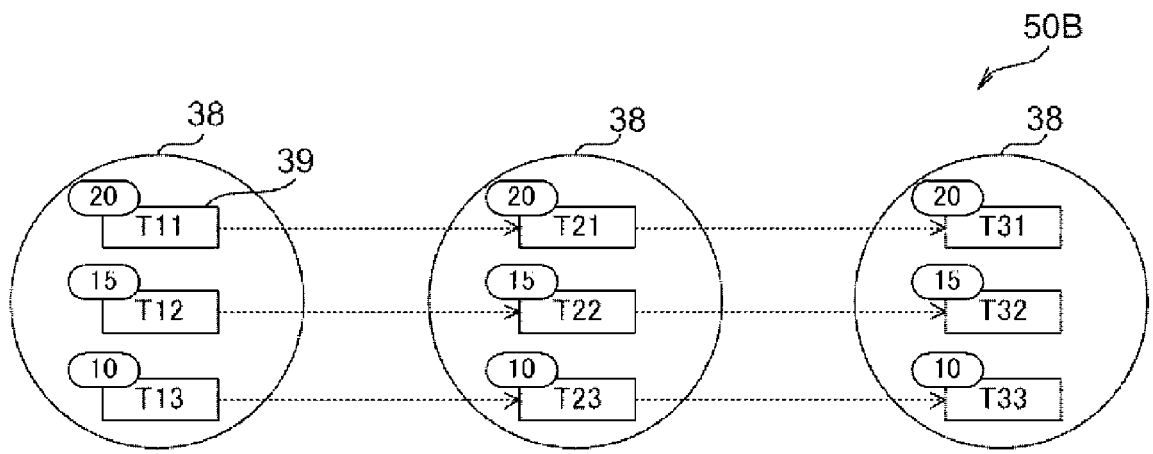
FIG. 10D is a view for explaining the process of assigning priorities to partial processes of an image processing DAG in which the number of image processing modules arranged in the terminal stage is one.

In the example of FIG. 10B in which one partial process 39 arranged on the post-stage side depends on a partial process 39 arranged on the pre-stage side, the priority assignment unit 64 assigns the priority of the partial process 39 arranged on the post-stage side to the partial process 39 of the image processing module 38 arranged on the pre-stage side, as shown in FIG. 10C. Similarly, the priority assignment unit 64 assigns the priority of the partial process 39 arranged on the post-stage side up to a partial process 39 of an image processing module 38 arranged in the frontmost stage.

Figure 11D:
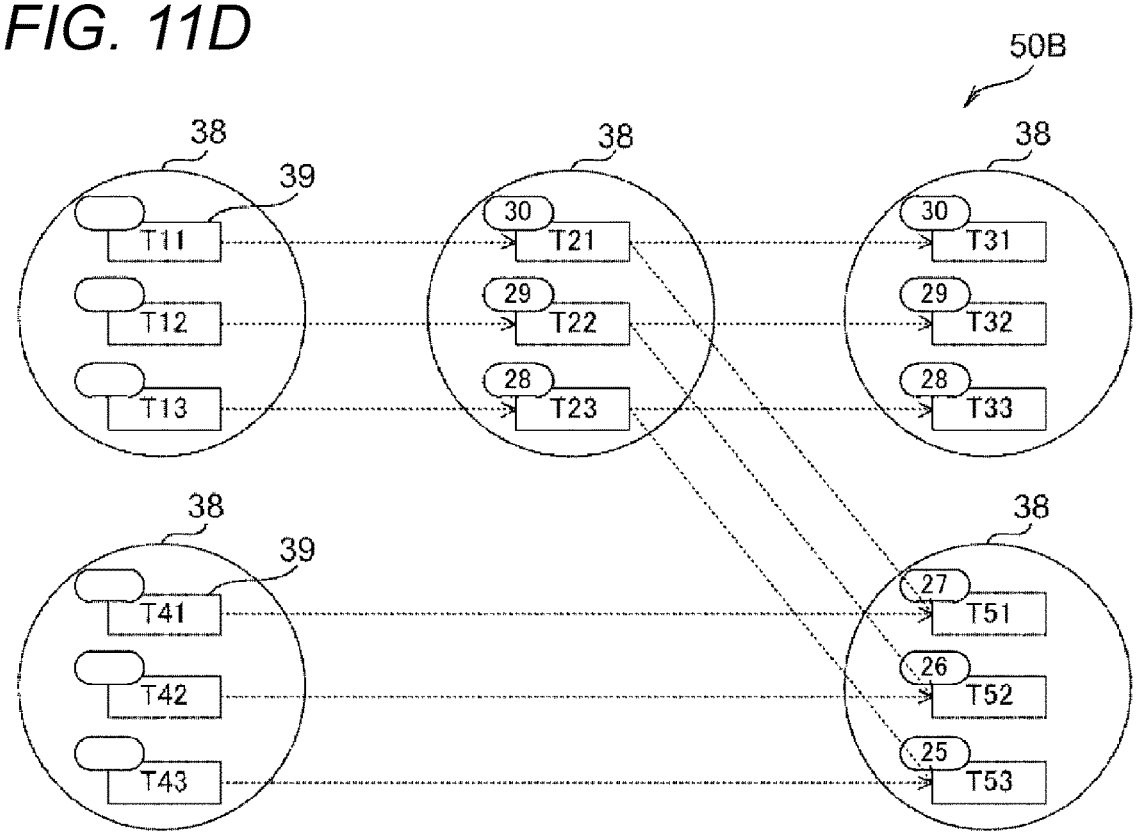
FIG. 11D is a view for explaining the process of assigning priorities to partial processes of an image processing DAG in which the number of image processing modules arranged in the terminal stage is two or more.
Figure 11E:
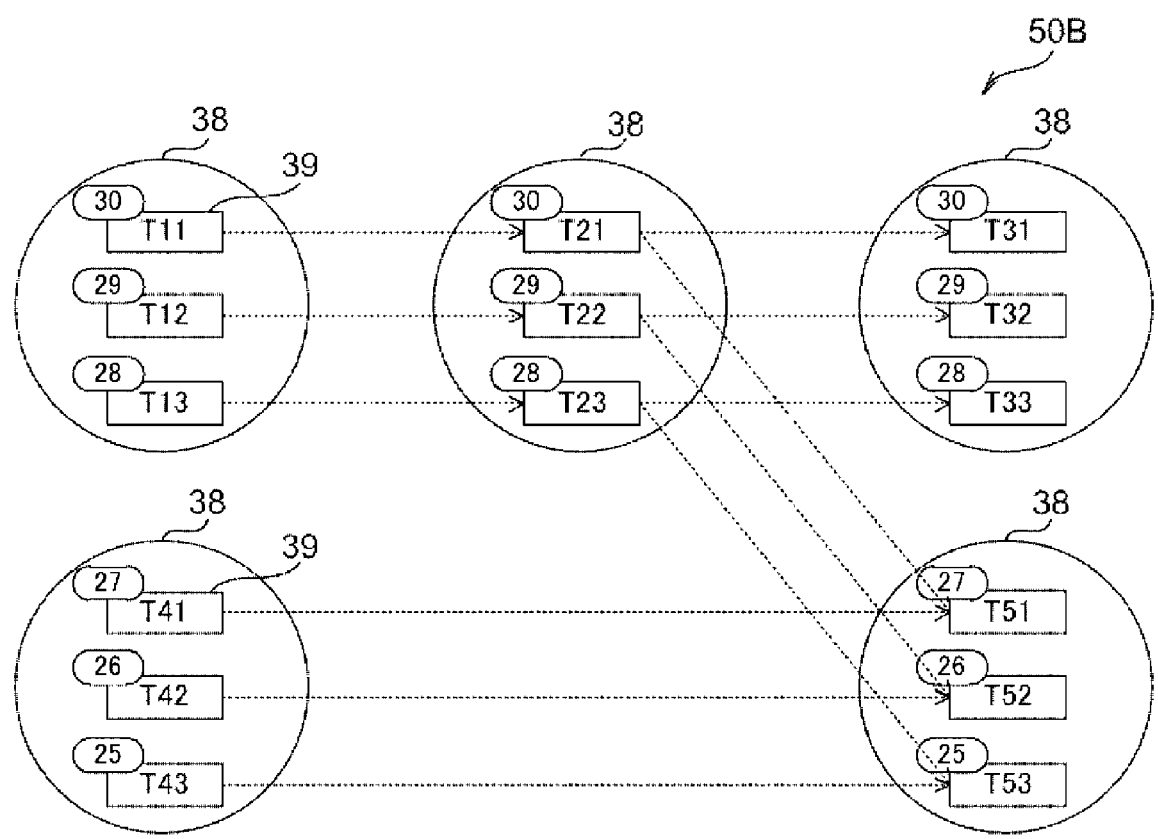
FIG. 11E is a view for explaining the process of assigning priorities to partial processes of an image processing DAG in which the number of image processing modules arranged in the terminal stage is two or more.
Figure 11F:
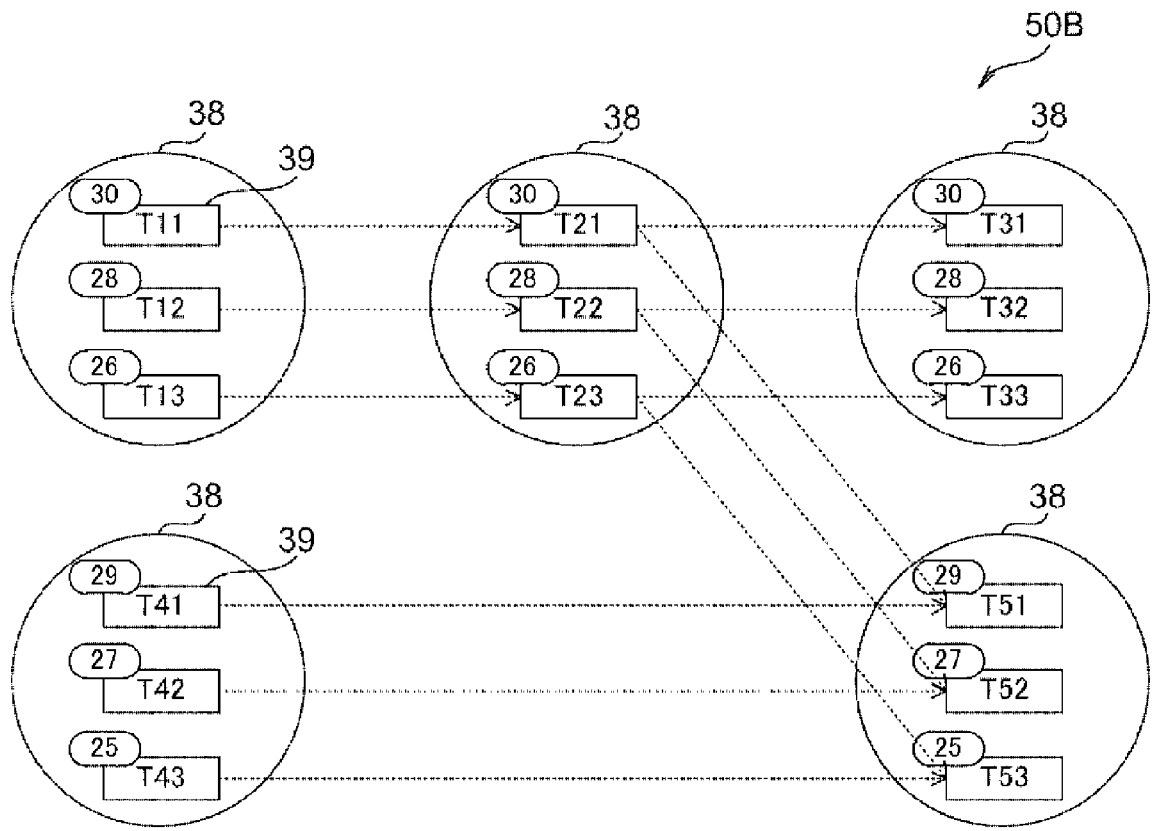
FIG. 11F is a view for explaining the process of assigning priorities to partial processes of an image processing DAG in which the number of image processing modules arranged in the terminal stage is two or more.

In the example of FIG. 11B in which plural partial processes 39 arranged on the post-stage side depends on a partial process 39 arranged on the pre-stage side, the priority assignment unit 64 assigns the largest value of the priorities of the partial processes 39 arranged on the post-stage side to the partial process 39 of the image processing module 38 arranged on the pre-stage side, as shown in FIG. 11D. As a specific example, in FIG. 11D, as the priority of the partial process T21, 30 which is the largest value of 30 which is the priority of the partial process T31 and 27 which is the priority of a partial process T51 is assigned. Similarly, the priority assignment unit 64 assigns the priority of the partial process 39 arranged on the post-stage side up to a partial process 39 of an image processing module 38 arranged in the frontmost stage, as shown in FIG. 11E. Also, the state where the priorities have been assigned to all partial processes 39 of the image processing DAG 50B shown in FIG. 11C is shown in FIG. 11F.

For example, whether to use the first assignment rule or the second assignment rule may be selected by user's designation, or may be selected according to a system request.

The priority assignment unit 64 does not assign priorities to partial processes 39 which have partial processes 39 connected thereto on the post-stage side and having no dependency relationship assigned.

The executable-partial-process storage unit 66 according to the present exemplary embodiment includes a storage area for storing a partial process 39 having the highest priority among the partial processes 39 which have become executable on the basis of the dependency relationship between the partial processes 39, according to the image processing DAG 50B.

The executing unit 68 according to the present exemplary embodiment stores the partial process 39 having the highest priority among the partial processes 39 which have become executable on the basis of the dependency relationship assigned between the partial processes 39, in the executable-partial-process storage unit 66, according to the image processing DAG 50B. The executing unit 68 executes the partial process 39 stored in the executable-partial-process storage unit 66. Also, the executing unit 68 does not store partial processes 39 having no priorities assigned, in the executable-partial-process storage unit 66, thereby excluding them from processing targets even if they become executable.

Figure 12:
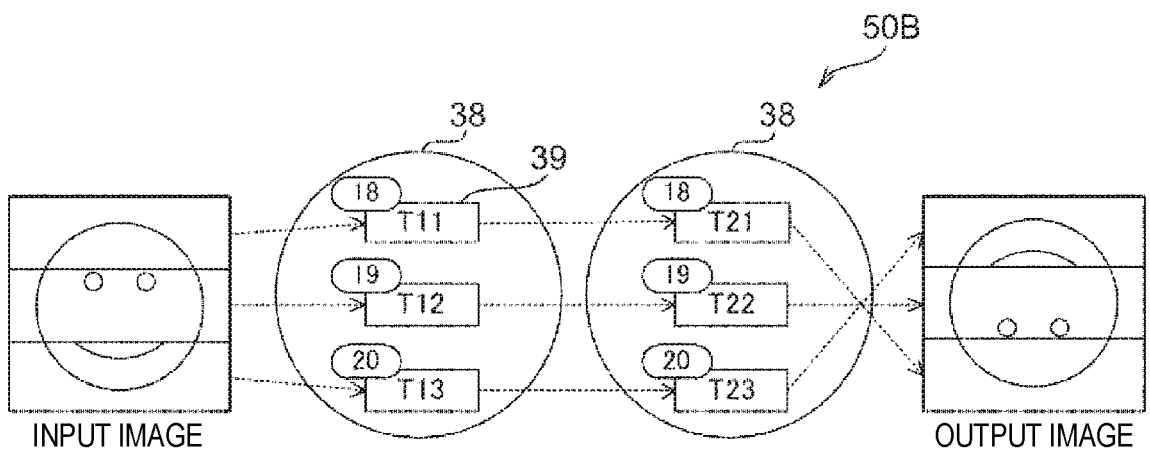
FIG. 12 is a schematic diagram illustrating an example of an image processing DAG having priorities assigned according to the exemplary embodiment.

As described above, the priority assignment unit 64 according to the present exemplary embodiment assigns priorities from the partial processes 39 of each image processing module 38 arranged in the terminal stage. Therefore, as shown in FIG. 12, even in the case where an image processing module 38 for executing image processing to flip an input image vertically as seen in a front view is connected after an image processing module 38 for executing image processing without flipping the input image vertically as seen in a front view, priorities are assigned such that an output image is output sequentially from the top as seen in a front view.

Figure 13:
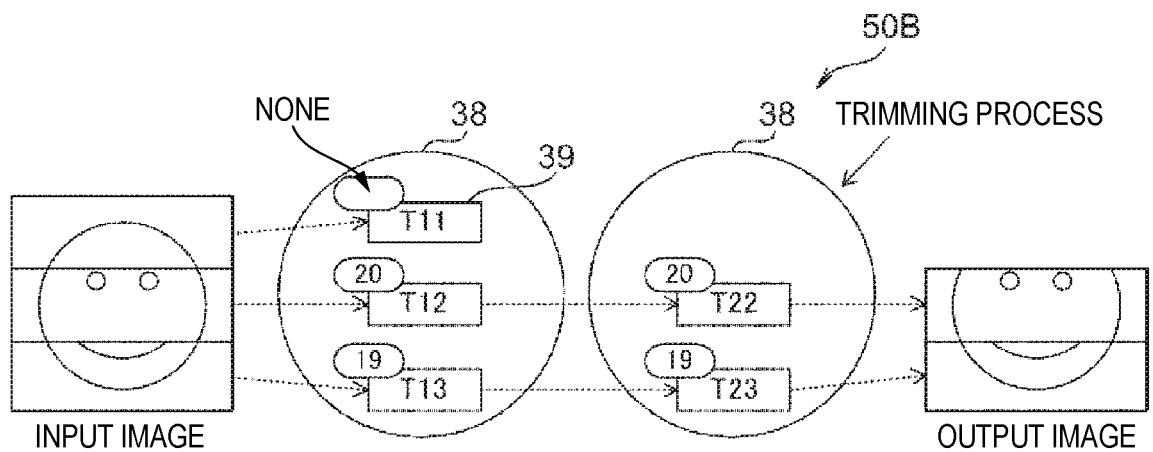
FIG. 13 is a schematic diagram illustrating an example of an image processing DAG having priorities assigned according to the exemplary embodiment.

Also, as shown in FIG. 13, since a priority is not assigned to each partial process 39 which has no partial processes 39 connected thereto on the post-stage side and having a dependency relationships (in the example of FIG. 13, the partial process T11), useless image processing is not executed.

Also, the priority assignment unit 64 according to the present exemplary embodiment assigns the largest value of the priorities of partial processes 39 arranged the post-stage side and having a dependency relationship assigned, as the priority of a partial process 39 of an image processing module 38 of the pre-stage side which has the partial processes 39 of the post-stage side connected thereto and having the dependency relationship assigned. Therefore, there may be plural executable partial processes 39 having the same priority. Now, the function of the process control unit 46 in the case where there are plural executable partial processes 39 having the same priority will be described.

As an example of a method by which the executing unit 68 selects a partial process 39 to be a processing target in the case where there are plural executable partial processes 39 having the same priority, a first method will be described.

In the first method, the executing unit 68 obtains first numbers to fourth numbers to be shown below, with respect to the plural individual partial processes 39 having the same priority and stored in the executable-partial-process storage unit 66, in the order of (1) to (4) to be shown below.

(1) A first number is the number of partial processes 39 which depend on a partial process 39, and become executable after execution of the corresponding partial process 39 is completed, and have the same priority as that of the corresponding partial process 39.

(2) A second number is the number of partial processes 39 which depend on a partial process 39 but do not become executable after execution of the corresponding partial process 39 is completed, and have the same priority as that of the corresponding partial process 39.

(3) A third number is the number of partial processes 39 which depend on a partial process 39, and become executable after execution of the corresponding partial process 39 is completed, and have priorities lower than that of the corresponding partial process 39.

(4) A fourth number is the number of partial processes 39 which depend on a partial process 39 but do not become executable after execution of the corresponding partial process 39 is completed, and have priorities lower than that of the corresponding partial process 39.

If those numbers are obtained, when the numbers obtained with respect to the individual partial processes 39 are different, the executing unit 68 selects and executes a partial process 39 having the largest one of the obtained numbers. In this case, the executing unit 68 does not obtain the subsequent numbers. For example, in the case where the first numbers obtained with respect to the individual partial processes 39 are different, the executing unit 68 executes a partial process 39 having the largest first number, and does not obtain the second numbers, the third numbers, and the fourth numbers. Therefore, as compared to the case of obtaining all of the first numbers to the fourth numbers, the amount of calculation decreases.

Now, as another example of the method by which the executing unit 68 selects a partial process 39 to be a processing target in the case where there are plural executable partial processes 39 having the same priority, a second method will be described.

In the second method, with respect to each of plural partial processes 39 having the same priority and stored in the executable-partial-process storage unit 66, the executing unit 68 obtains a difference D to be shown below. In this case, the executing unit 68 obtains a difference D by subtracting the amount of memory of an input area which is released after execution of a partial process 39 is completed from the amount of memory of an output area required to execute the corresponding partial process 39. Specifically, the executing unit 68 obtains a difference D according to the following Expression (1). In Expression (1), O represents the amount of memory of an output area of a partial process 39 required to execute the partial process 39, and I represents the amount of memory of an input area of the partial process 39 which is released after execution of the partial process 39 is completed.

$$D=O-I \qquad (1)$$

The executing unit 68 selects and executes a partial process 39 having the smallest one of the differences D obtained with respect to the individual partial processes 39.

Figure 14:
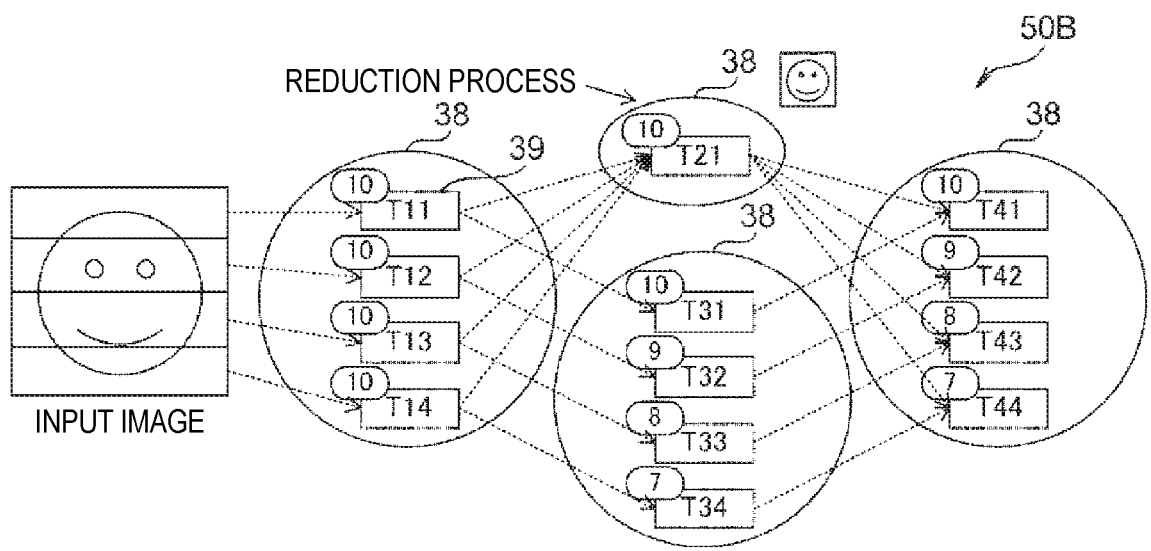
FIG. 14 is a schematic diagram an example of an image processing DAG having priorities assigned according to the exemplary embodiment.

As an example, the order of execution of partial processes 39 in the case of executing image processing using the first method according to the image processing DAG 50B having priorities assigned as shown in FIG. 14 will be described with reference to FIG. 15.

Figures 15, 16:
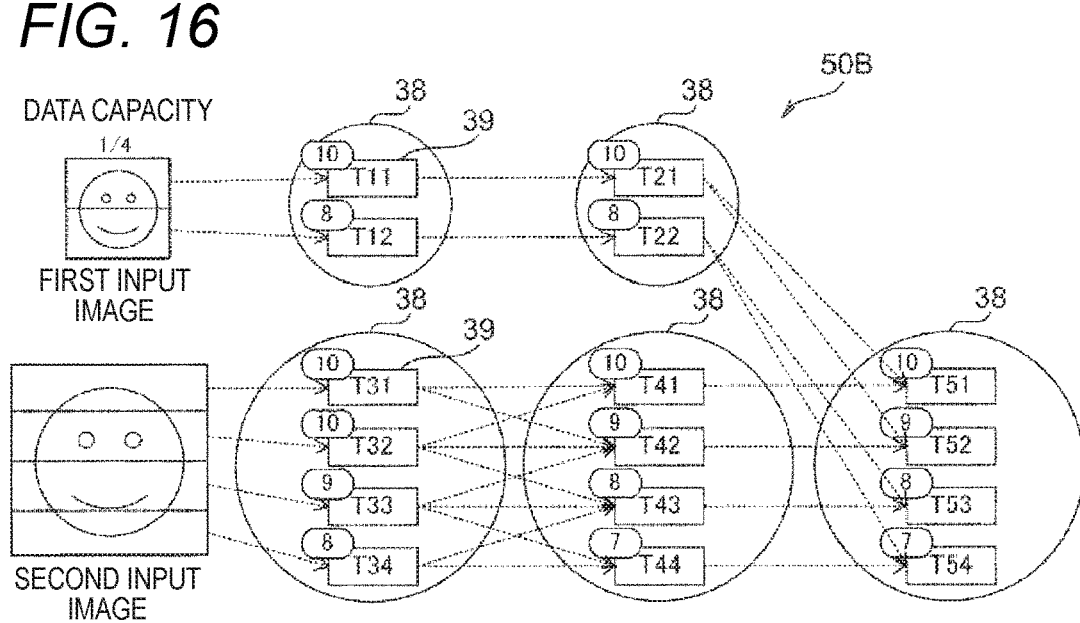
FIG. 15 is a view for explaining the order of execution of the individual partial processes of the image processing DAG shown in FIG. 14.
FIG. 16 is a schematic diagram illustrating an example of an image processing DAG having priorities assigned according to the exemplary embodiment.

As shown in FIG. 15, at a time point t0 when execution of image processing starts, the partial processes T11 to T14 become executable. The partial processes T11 to T14 have the same priority "10".

According to the first method, the executing unit 68 obtains the first numbers with respect to the partial processes T11 to T14, respectively. Specifically, since only the partial process T31 is a partial process 39 which depends on the partial process T11, and becomes executable after execution of the partial process T11 is completed, and has the same priority as that of the partial process T11, the first number becomes 1. Meanwhile, since there is no partial process 39 which depends on the partial process T12, and becomes executable after execution of the partial process T12 is completed, and has the same priority as that of the partial process T12, the first number becomes 0. Similarly, even with respect to the partial processes T13 and T14, the first numbers become 0.

Therefore, the executing unit 68 selects and executes the partial process T11 having the largest one of the first numbers obtained with respect to the individual partial processes T11 to T14. Also, in this case, the executing unit 68 does not obtain the second number to the fourth number with respect to each of the partial processes T11 to T14.

Since the partial process T31 newly becomes executable if execution of the partial process T11 is completed, at a time point t1, the partial processes T11 to T14 and T31 become executable. Further, the partial processes T11 to T14 and T31 have the same priority "10".

Therefore, according to the first method, the executing unit 68 obtains the first numbers with respect to the partial processes T11 to T14 and T31, respectively. With respect to each of the partial processes T11 to T14 and T31, since there is no partial process 39 which depend on the corresponding partial process T11, T12, T13, T14, or T31, and becomes executable after execution of the corresponding partial process is completed, and has the same priority as that of the corresponding partial process T11, T12, T13, T14, or T31, the first number becomes 0. Since the first numbers obtained with respect to the individual partial processes T11 to T14 and T31 are the same, subsequently, the executing unit 68 obtains the second numbers.

Specifically, since only the partial process T21 is a partial process 39 which depends on the partial process T12 but does not become executable after execution of the partial process T12 is completed, and has the same priority as that of the partial process T12, the second number becomes 1. Similarly, since only the partial process T21 is a partial process 39 which depends on the partial processes T13 and T14 but does not become executable after execution of the partial process T13 or T14 is completed, and has the same priority as those of the partial processes T13 and T14, the second number become 1. Also, since only the partial process T41 is a partial process 39 which depends on the partial process T31 but does not become executable after the partial process T31 is completed, and has the same priority as that of the partial process T31, the second number becomes 1. Since the second numbers obtained with respect to the individual partial processes T11 to T14 and T31 are the same, subsequently, the executing unit 68 obtains the third numbers.

Specifically, since only the partial process T32 is a partial process 39 which depends on the partial process T12, and becomes executable after execution of the partial process T12 is completed, and has a priority lower than that of the partial process T12 (here, a priority "9" smaller than the value of the priority of the partial process T12 by 1), the second number becomes 1. Meanwhile, since there is no partial process 39 which depends on the partial process T13, T14, or T31, and becomes executable after execution of the corresponding partial process T13, T14, or T31 is completed, and has the priority "9", the third numbers become 0.

Therefore, the executing unit 68 selects and executes the partial process T12 having the largest one of the third numbers obtained with respect to the individual partial processes T11 to T14 and T31. In this case, the executing unit 68 does not obtain the fourth numbers with respect to the individual partial processes T11 to T14 and T31.

Since the partial process T32 newly becomes executable if execution of the partial process T12 is completed, at a time point t2, the partial processes T13, T14, T31, and T32 become executable. Further, the highest priority of the priorities of the partial processes T13, T14, T31, and T32 is 10, and partial processes 39 having 10 assigned as priorities are the partial processes T13, T14, and T31.

Therefore, according to the first method, the executing unit 68 obtains the first numbers with respect to the partial processes T13, T14, and T31, respectively. Since the method of obtaining the first numbers to the fourth numbers have been described above, hereinafter, a detailed description thereof will not be made. As shown in FIG. 15, with respect to each of the partial processes T13, T14, and T31, the first number becomes 0, and the second number becomes 1. Further, with respect to each of the partial processes T13, T14, and T31, the third number and the fourth number related to partial processes 39 having the priority "9" become 0.

In this case, in the present exemplary embodiment, the executing unit 68 obtains the third numbers related to partial processes 39 having a lower priority "8", with respect to the partial processes T13, T14, and T31, respectively. With respect to the partial process T13, the third number related to partial processes 39 having the priority "8" becomes 1, and with respect to the partial processes T14 and T31, the third numbers become 0. Therefore, the executing unit 68 selects and executes the partial process T13.

Similarly, at a time point t3, of the partial processes T14 and T31, the partial process T14 having the largest first number is selected and executed, and at a time point t4, of the partial processes T21 and T31, the partial process T21 having the largest fourth number is selected and executed. At each time point after the time point t5, since only one partial process 39 is executable and has the highest priority, the corresponding partial process 39 is executed.

Now, as an example, the order of execution of partial processes 39 in the case of executing image processing using a combination of the first method and the second method according to the image processing DAG 50B having priorities assigned as shown in FIG. 16 will be described with reference to FIG. 17. Here, as an example of the combination of the first method and the second method, an example in which the first numbers and the second numbers are obtained according to the first method, and when the obtained numbers are the same, the second method is used will be described.

In the image processing DAG 50B shown in FIG. 16, it is assumed that two input images are processing targets, and the numbers of pixels of the first input image in the vertical direction and the horizontal direction are halves of those of the second input image, in other words, the capacity of image data representing the first input image is ¼ of the capacity of image data representing the second input image. Further, in the example shown in FIG. 16, it is assumed that the first input image is divided into two image sections having the same capacity, and the second input image is divided into four image sections having the same capacity. In the present exemplary embodiment, the amount of memory required to store each image section is handled as a relative value. Specifically, it is assumed that the amount of memory required to store an image section obtained by dividing the first input image is 1. Therefore, the amount of memory required to store an image section obtained by dividing the second input image becomes 2 according to the following Expression (2).

[The amount of memory required to store an image section obtained by dividing the second input image]=[The amount of memory required to store the first input image (1×2=2)]×4 (times)÷4 (The number of image sections)=2 (2)

As shown in FIG. 17, at a time point t0 when execution of image processing starts, partial processes 39 which are executable and have the highest priority (in the example of FIG. 17, 10) are only three, i.e. the partial processes T11, T31, and T32. Therefore, according to the first method, the executing unit 68 obtains the first numbers with respect to the partial processes T11, T31, and T32, respectively. As shown in FIG. 17, with respect to the partial process T11, the first number becomes 1, and with respect to the partial processes T31 and T32, the first numbers become 0. Therefore, the partial process T11 is selected and executed.

Since the partial process T21 newly becomes executable if execution of the partial process T11 is completed, at a time point t1, executable partial processes 39 having the highest priority are the partial processes T21, T31, and T32. Therefore, the executing unit 68 obtains the first numbers with respect to the partial processes T21, T31, and T32, respectively, according to the first method. As shown in FIG. 17, with respect to each of the partial processes T21, T31, and T32, the first number becomes 0, and the second number becomes 1. With respect to the individual partial processes T21, T31, and T32, the first numbers are the same and the second numbers are the same. Therefore, the second method is used.

With respect to each of the partial processes T21, T31, and T32, the executing unit 68 obtains a difference D (referred to as increase or decrease in the amount of memory in FIG. 17) according to the above-mentioned Expression (1). Specifically, since the amount of memory of an output area required to execute the partial process T21 is 1, and the amount of memory of an input area (i.e. the output area of the partial process T11) which is released after execution of the partial process T21 is completed is 1, the difference D becomes 0 (=1−1). Meanwhile, since the amount of memory of an output area required to execute the partial process T31 is 2, and the amount of memory of an input area which is released after execution of the partial process T31 is completed is 0, the difference D becomes 2 (=2−0). Similarly, even with respect to the partial process T32, the difference D becomes 2 (=2−0). In the present exemplary embodiment, it is assumed that a storage area retaining an input image to be input to the image processing module 38 arranged in the frontmost stage of the image processing DAG 50B is not released until image processing of all image processing modules 38 of the image processing DAG 50B finishes.

The executing unit 68 selects the partial process T21 having the smallest difference D from the partial processes T21, T31, and T32, and executes it. Since there is no partial process 39 which newly becomes executable even if execution of the partial process T21 is completed, at a time point t2, the partial processes T31 and T32 become executable partial process 39 having the highest priority. Therefore, the executing unit 68 obtains the first numbers with respect to the partial processes T31 and T32, respectively, according to the first method. As shown in FIG. 17, with respect to each of the partial processes T31 and T32, the first number becomes 0, and the second number becomes 1. With respect to the individual partial processes T31 and T32, the first numbers are the same and the second numbers are the same. Therefore, the second method is used.

With respect to each of the partial processes T31 and T32, the executing unit 68 obtains a difference D according to the above-mentioned Expression (1). Specifically, since the amount of memory of an output area required to execute the partial process T31 is 2, and the amount of memory of an input area which is released after execution of the partial process T31 is completed is 0, the difference D becomes 2 (=2−0). Similarly, even with respect to the partial process T32, the difference D becomes 2 (=2−0). Since the partial processes T31 and T32 have the same difference D, the executing unit 68 determines that any of them may be preferentially executed, and selects the partial process T31, and executes it.

At each of time points t3 to t8, since only one partial process 39 is executable and has the highest priority, the corresponding partial process 39 is executed. At a time point t9, the partial processes T12 and T34 become executable partial processes 39 having the highest priority. Therefore, the executing unit 68 obtains the first numbers with respect to the partial processes T12 and T34, respectively, according to the first method. As shown in FIG. 17, with respect to each of the partial processes T12 and T34, the first number becomes 0 and the second number becomes 1. With respect to the individual partial processes T12 and T34, the first numbers are the same and the second numbers are the same. Therefore, the second method is used.

With respect to each of the partial processes T12 and T34, the executing unit 68 obtains a difference D according to the above-mentioned Expression (1). Specifically, since the amount of memory of an output area required to execute the partial process T12 is 1, and the amount of memory of an input area which is released after execution of the partial process T12 is completed is 0, the difference D becomes 1 (=1−0). Meanwhile, since the amount of memory of an output area required to execute the partial process T34 is 2, and the amount of memory of an input area which is released after execution of the partial process T34 is completed is 0, the difference D becomes 2 (=2−0). Therefore, the executing unit 68 selects the partial process T12 having the smallest one of the differences D obtained with respect to the individual partial processes T12 and T34, and executes it.

Thereafter, the same procedure is executed, and a detailed description thereof will not be made. By the way, at a time point t10, of the partial processes T22 and T34, the partial process T34 having the largest first number is selected and executed. At a time point t11, with respect to the individual partial processes T22 and T43, the first numbers are the same, and the second numbers are the same, and the differences D are the same. Therefore, the partial process T22 is selected and executed. At each time point from the time point t12, since the number of executable partial processes 39 having the highest priority is one, the corresponding partial process 39 is executed.

Whether to use only the first method, or only the second method, or the combination of the first method and the second method is not particularly limited. For example, it may be selected by user's designation, or may be selected according to a system request.

The output unit 70 according to the present exemplary embodiment outputs output image data obtained as the result of the image processing executed by the partial processes 39 of the image processing module 38 arranged in the terminal stage of the image processing DAG 50B. In the present exemplary embodiment, the output unit 70 displays the obtained output image data on the display unit 16. However, the output unit 70 may output (transmit) the output image data to an external device. Also, in the case where the computer 10 is incorporated in a printer, the output unit 70 may output (form) an output image represented by the output image data on a recording material such as paper.

Figure 18:
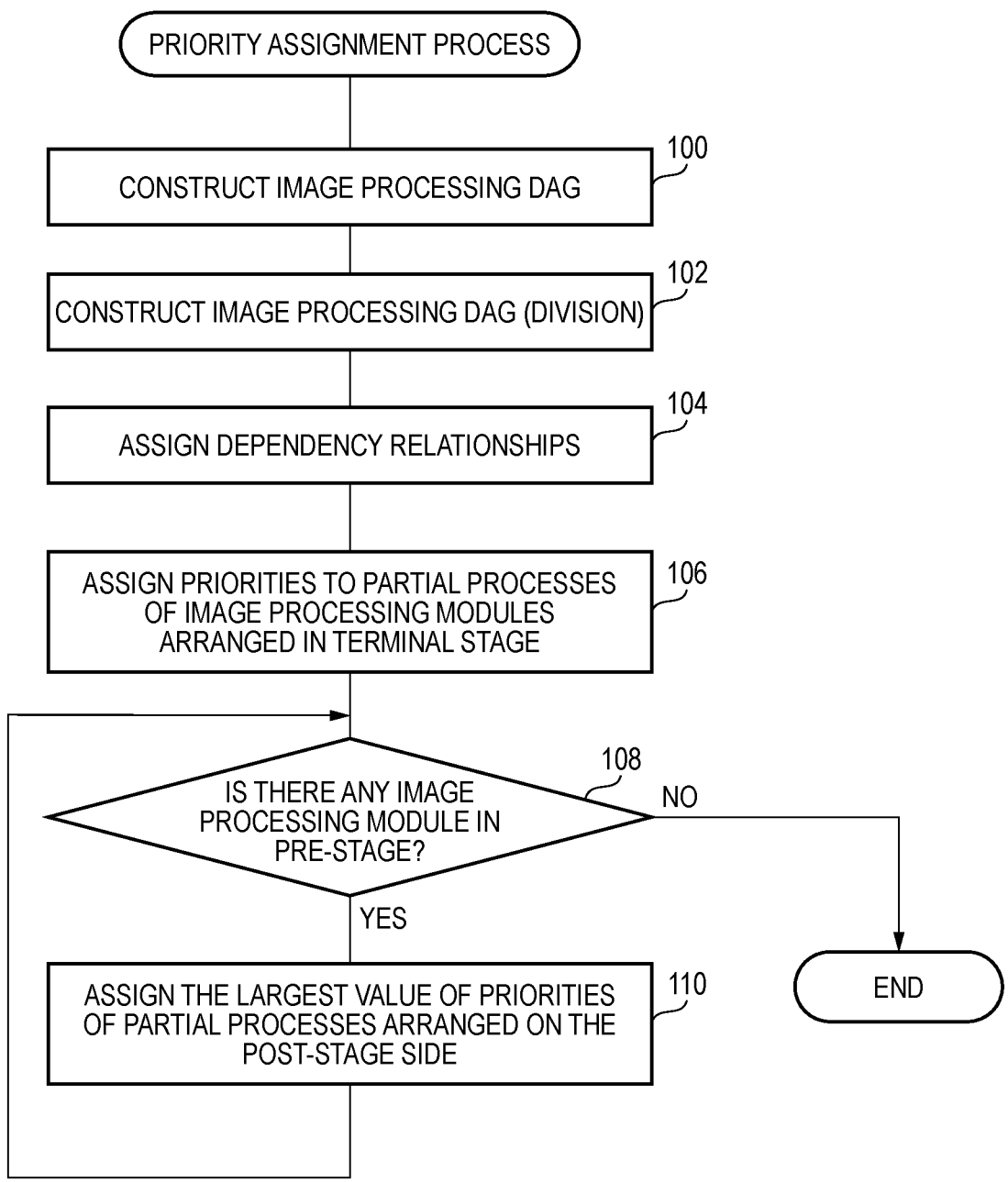
FIG. 18 is a flow chart illustrating the process flow of a priority assignment process program according to the exemplary embodiment.

Now, with reference to FIG. 18 and FIG. 19, actions of the computer 10 according to the present exemplary embodiment will be described. FIG. 18 is a flow chart illustrating the processing flow of the priority assignment process program which is executed by any one of the cores included in the first calculating unit 12A if an instruction for starting execution of image processing is input by the application 32.

This priority assignment process program is installed in the storage unit 20 in advance. A core included in the first calculating unit 12A executes the image processing program, whereby the first calculating unit 12A functions as the process construction unit 42, the dividing unit 60, the dependency relationship assignment unit 62, and the priority assignment unit 64 described above.

Figure 19:
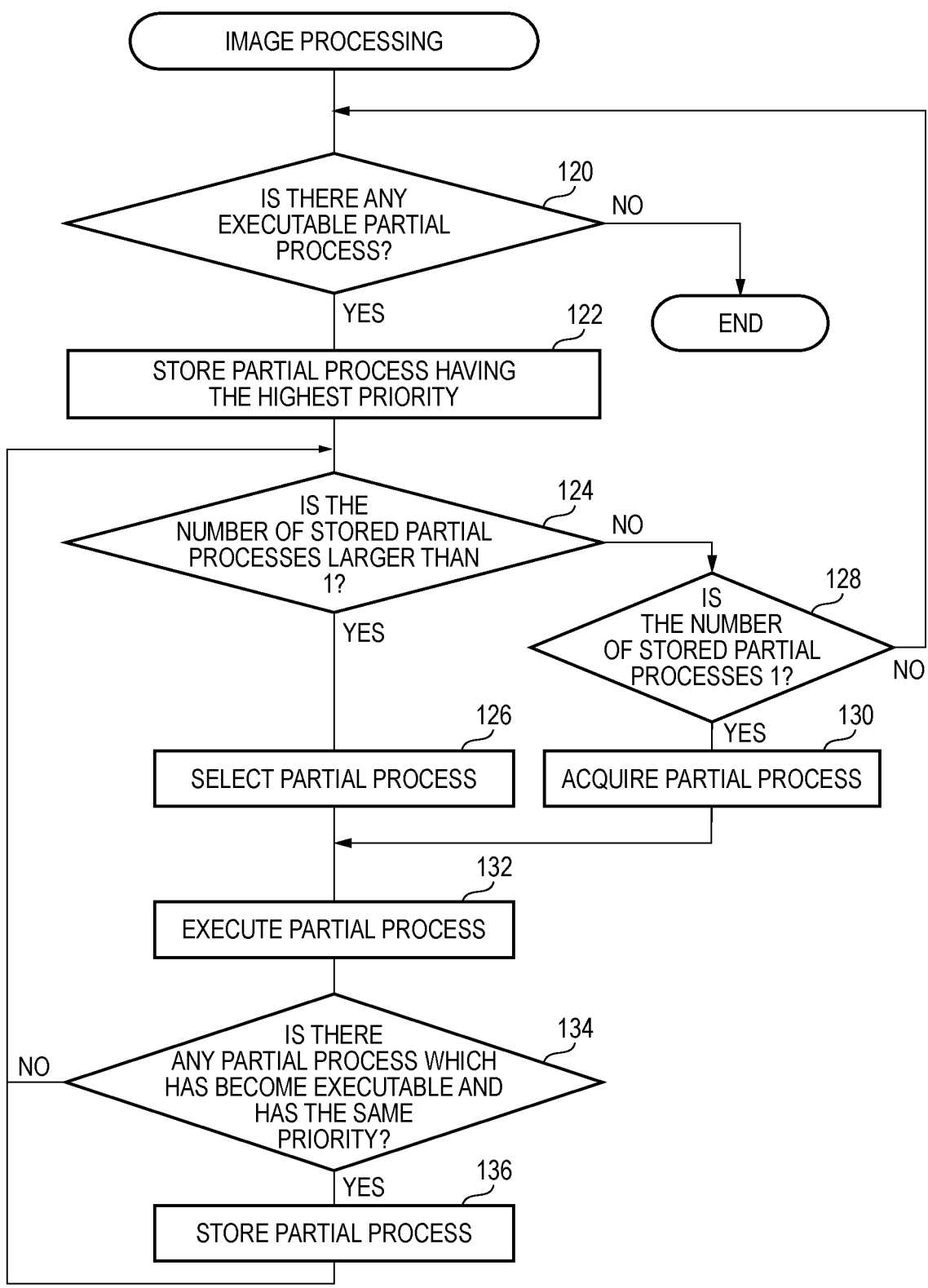
FIG. 19 is a flow chart illustrating the process flow of an image processing program according to the exemplary embodiment.

FIG. 19 is a flow chart illustrating the processing flow of the image processing program which is executed by a core included in the first calculating unit 12A after the priority assignment process program shown in FIG. 18 finishes. This image processing program is installed in the storage unit 20 in advance. The core of the first calculating unit 12A executes the image processing program, whereby the first calculating unit 12A functions as the executing unit 68 and the output unit 70 described above. By the way, the image processing shown in FIG. 19 may be executed by one core of the first calculating unit 12A, or may be executed in parallel by plural cores of the first calculating unit 12A.

In STEP 100 of FIG. 18, the process construction unit 42 constructs an image processing DAG 50A for executing image processing instructed by the application 32, according to a construction instruction from the application 32. In STEP 102, the dividing unit 60 divides input image data into plural image-section data items as described above. With respect to the image processing DAG 50A constructed in STEP 100, the dividing unit 60 divides image processing to be executed by each image processing module 38, into partial processes 39 corresponding to the image-section data items, respectively, thereby constructing an image processing DAG 50B.

In STEP 104, according to the types of image processing to be executed by the image processing modules 38, the dependency relationship assignment unit 62 assigns dependency relationships between the partial processes 39 of image processing modules 38 connected in the pre-stage and the partial processes 39 of image processing modules 38 connected in the post-stage. In STEP 106, the priority assignment unit 64 assigns priorities to the partial processes 39 of each image processing module 38 arranged in the terminal stage, of the individual image processing modules 38 of the image processing DAG 50B, according to a predetermined assignment rule, as described above.

In STEP 108, with respect to each of partial processes 39 having priorities already assigned, the priority assignment unit 64 determines whether there is a partial process 39 of an image processing module 38 connected thereto on the pre-stage side and having a dependency relationship with respect to the corresponding partial process. In the case where the result of this determination is positive, the process proceeds to STEP 110.

In STEP 110, the priority assignment unit 64 assigns the largest value of the priorities of partial processes 39 connected on the post-stage side and having dependency relationships assigned with respect to the partial process of the image processing module 38 of the pre-stage side, as the priority of the partial process 39 of the pre-stage side, as described above. If the process of STEP 110 finishes, the process returns to STEP 108. Meanwhile, in the case where the result of the determination of STEP 108 is negative, the present priority assignment process ends.

In STEP 120 of FIG. 19, the executing unit 68 determines whether there is any executable partial process 39 in the partial processes 39 having become executable on the basis of the dependency relationships assigned between the individual partial processes 39 according to the image processing DAG 50B. In the case where the result of this determination is positive, the process proceeds to STEP 122.

In STEP 122, the executing unit 68 stores partial processes 39 having the highest priority among the partial processes 39 determined as having become executable in STEP 120, in the executable-partial-process storage unit 66. In STEP 124, the executing unit 68 determines whether the number of partial processes 39 stored in the executable-partial-process storage unit 66 is larger than 1. In the case where the result of this determination is negative, the processing proceeds to STEP 128; whereas in the case where the determination result is positive, the processing proceeds to STEP S126.

In STEP 126, the executing unit 68 selects one partial process 39 from the partial processes 39 stored in the executable-partial-process storage unit 66, according to the first method, the second method, or the combination of the first method and the second method, as described above. In STEP 128, the executing unit 68 determines whether the number of partial processes 39 stored in the executable-partial-process storage unit 66 is 1. In the case where the result of this determination is negative, the processing returns to STEP 120; whereas in the case where the determination result is positive, the processing proceeds to STEP S130. In STEP 130, the executing unit 68 selects the partial process 39 as a processing target by acquiring the partial process 39 stored in the executable-partial-process storage unit 66. If the process of STEP 126 or STEP 130 finishes, the processing proceeds to STEP 132.

In STEP 132, the executing unit 68 executes the partial process 39 selected in STEP 126 or STEP 130. As an example, in the case where a calculating unit represented by the calculating-unit information of the image processing module 38 is the second calculating unit 12B, the executing unit 68 executes the partial process 39 by making the second calculating unit 12B execute the partial process 39 and acquiring the execution result from the second calculating unit 12B. Further, after executing the partial process 39, the executing unit 68 updates the dependency relationships of the image processing DAG 50B. In the case where the partial process 39 executed by the executing unit 68 is a partial process 39 of the image processing module 38 arranged in the terminal stage of the image processing DAG 50B, the output unit 70 outputs output image data obtained as the result of the image processing executed by the partial process 39, as described above.

In STEP 134, the executing unit 68 determines whether there is any partial process 39 which has newly become executable and to which the same priority as the priority of the partial process 39 stored in the executable-partial-process storage unit 66 has been assigned according to the image processing DAG 50B. In the case where the result of this determination is negative, the processing returns to STEP 124; whereas in the case where the determination result is positive, the processing proceeds to STEP S136.

In STEP 136, the executing unit 68 stores the partial process 39 which has newly become executable and to which the same priority as the priority of the partial process 39 stored in the executable-partial-process storage unit 66 has been assigned, in the executable-partial-process storage unit 66. If the process of STEP 136 finishes, the processing returns to STEP 124. In the case where the result of the determination of STEP 120 is negative, the present image processing ends.

As described above, according to the present exemplary embodiment, priorities are assigned to the partial processes 39 of the image processing module 38 arranged in the terminal stage of the image processing DAG 50B. As the priority of a partial process 39 of an image processing module 38 of the pre-stage side which has partial processes 39 connected thereto on the post-stage side and having dependency relationships assigned, the largest value of the priorities of the partial processes 39 arranged on the post-stage side and having the dependency relationships assigned is assigned. Therefore, as compared to the case of assigning priorities in order from the partial processes of an object arranged on the pre-stage side of a DAG, reduction in the processing efficiency of image processing is suppressed.

Also, according to the present exemplary embodiment, a higher priority is assigned to partial processes 39 of processing an image-section data item representing an image section to be positioned on the upper side of an output image as seen in a front view, than to partial processes 39 of processing an image-section data item representing an image section to be positioned on the lower side of the output image as seen from in the front view. Therefore, the partial processes 39 of processing the image-section data item representing the image section to be positioned on the upper side as seen in the front view finish earlier than the partial processes 39 of processing the image-section data item representing the image section to be positioned on the lower side as seen in the front view.

In the above-described exemplary embodiment, it has been described that priorities are not assigned to partial processes 39 which have partial processes 39 connected thereto on the post-stage side and having no dependency relationship assigned; however, the present invention is not limited thereto. For example, to partial processes 39 which have partial processes 39 connected thereto on the post-stage side and having no dependency relationship assigned, a predetermined priority may be assigned as a priority representing that the partial processes 39 do not need to be executed. In this case, for example, the executing unit 68 excludes the partial processes 39 having the predetermined priority from processing targets. Further, in this case, in the case where priorities which are positive integers are assigned to individual partial processes 39 like in the above-described exemplary embodiment, as the predetermined priority, a negative integer may be assigned.

Also, in the above-described exemplary embodiment, the case of obtaining the first number, the second number, the third number, and the fourth number in order in the first method has been described; however, the present invention is not limited thereto. In the first method, any one of the first number, the second number, the third number, and the fourth number may be obtained. In this case, for example, a partial process 39 having the largest one of obtained numbers may be selected and executed. Also, in the first method, two or more of the first number, the second number, the third number, and the fourth number may be obtained. In this case, a partial process 39 having the largest one of the sums of obtained numbers may be selected and executed.

Also, the method of assigning priorities to the partial processes 39 of the image processing module 38 arranged in the terminal stage is not limited to the example shown in the above-described exemplary embodiment. For example, according to calculating-unit information, priorities may be assigned to the partial processes 39. For example, in the case where the image processing speed performance of the second calculating unit 12B is higher than that of the first calculating unit 12A, the priorities of the partial processes 39 of image processing modules 38 to be executed by the second calculating unit 12B may be set to be higher than the priorities of the partial processes 39 of image processing modules 38 to be executed by the first calculating unit 12A.

Also, in the above-described exemplary embodiment, the case of making a calculating unit represented by calculating-unit information execute image processing of the image processing modules 38 has been described; however, the present invention is not limited thereto. For example, image processing of image processing modules 38 for executing image processing on the same image, like three connected image processing modules 38 shown in the upper stage of FIG. 9, may be executed by the same calculating unit.

Also, in the present exemplary embodiment, the aspect in which the various programs are stored (installed) in the storage unit 20 in advance has been described; however, the present invention is not limited thereto. The various programs may be provided in a form in which they have been recorded on a storage medium such as a CD-ROM, a digital versatile disc read only memory (DVD-ROM), or a universal serial bus (USB) memory. Also, the various programs may be downloaded from an external device through a network.

Although various exemplary embodiments have been described above with reference to the drawings, the present invention is not limited to those examples. It is obvious that those skilled in the art may devise various alterations or modifications within the scope as set forth in the claims, and it is to be understood that these alterations and modifications belong, as a matter of course, to the technical scope of the present invention. In addition, the individual components of the above-described exemplary embodiments may be arbitrarily combined without departing from the spirit of the invention.

In the exemplary embodiments above, the term "processing unit" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

In the exemplary embodiments above, the term "processing unit" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus for executing partial processes on each of a plurality of image-section data items, corresponding to a plurality of image sections obtained by dividing an input image into partial regions, in each object of an object group in which a plurality of objects for executing image processing is connected to one another in a directed acyclic graph form, the image processing apparatus comprising a processor configured to:

assign dependency relationships to the partial processes between objects that are connected in the plurality of objects;

assign a priority to a partial process of an object arranged in a terminal stage of the object group;

assign, as a priority of a partial process of an object arranged at a pre-stage side which has at least one partial process that is connected at a post-stage side and that has the dependency relationship assigned, a largest value of the priority assigned to the at least one partial process that is connected at the post-stage side and that has the dependency relationship assigned; and execute a partial process having become executable according to the dependency relationship, according to the priority assigned.

2. The image processing apparatus according to claim 1, wherein, when assigning the priority to the partial process of the object arranged in the terminal stage, the processor assigns a higher priority to a partial process of processing an image-section data item representing an image section to be positioned on an upper side of an output image as seen in a front view, than to a partial process of processing an image-section data item representing an image section to be positioned on a lower side of the output image as seen in the front view.

3. The image processing apparatus according to claim 2, wherein in a case where there is a plurality of objects arranged in the terminal stage in the object group, the processor assigns priorities such that image processing is executed in order in units of the objects, or assigns priorities such that the partial processes of the objects are executed in turn between the objects, in assigning priorities to the partial processes of the plurality of objects arranged in the terminal stage.

4. The image processing apparatus according to claim 3, wherein the processor is configured to select whether to assign priorities such that the image processing is executed in order in units of the objects or to assign priorities such that the partial processes of the objects are executed in turn between the objects.

5. The image processing apparatus according to claim 4, wherein the processor is configured not to assign a priority, or to assign a predetermined priority representing that the partial processes do not need to be executed, to a partial process to which a partial process having no dependency relationship assigned is connected on the post-stage side, and the processor excludes the partial process having no priority assigned or the partial processes having the predetermined priority assigned, from a processing target.

6. The image processing apparatus according to claim 2, wherein the processor is configured not to assign a priority, or to assign a predetermined priority representing that the partial processes do not need to be executed, to a partial process to which a partial process having no dependency relationship assigned is connected on the post-stage side, and the processor excludes the partial process having no priority assigned or the partial processes having the predetermined priority assigned, from a processing target.

7. The image processing apparatus according to claim 3, wherein the processor is configured not to assign a priority, or to assign a predetermined priority representing that the partial processes do not need to be executed, to a partial process to which a partial process having no dependency relationship assigned is connected on the post-stage side, and the processor excludes the partial process having no priority assigned or the partial processes having the predetermined priority assigned, from a processing target.

8. The image processing apparatus according to claim 1, wherein, in a case where there is a plurality of objects arranged in the terminal stage in the object group, the processor assigns priorities such that image processing is executed in order in units of the objects, or assigns priorities such that the partial processes of the objects are executed in turn between the objects, in assigning priorities to the partial processes of the plurality of objects arranged in the terminal stage.

9. The image processing apparatus according to claim 8, wherein the processor is configured to select whether to assign priorities such that the image processing is executed in order in units of the objects or to assign priorities such that the partial processes of the objects are executed in turn between the objects.

10. The image processing apparatus according to claim 9, wherein the processor is configured not to assign a priority, or to assign a predetermined priority representing that the partial processes do not need to be executed, to a partial process to which a partial process having no dependency relationship assigned is connected on the post-stage side, and the processor excludes the partial process having no priority assigned or the partial processes having the predetermined priority assigned, from a processing target.

11. The image processing apparatus according to claim 8, wherein the processor is configured not to assign a priority, or to assign a predetermined priority representing that the partial processes do not need to be executed, to a partial process to which a partial process having no dependency relationship assigned is connected on the post-stage side, and the processor excludes the partial process having no priority assigned or the partial processes having the predetermined priority assigned, from a processing target.

12. The image processing apparatus according to claim 1, wherein the processor is configured not to assign a priority, or to assign a predetermined priority representing that the partial processes do not need to be executed, to a partial process to which a partial process having no dependency relationship assigned is connected on the post-stage side, and the processor excludes the partial process having no priority assigned or the partial processes having the predetermined priority assigned, from a processing target.

13. The image processing apparatus according to claim 1, wherein,
in a case where there is a plurality of executable partial processes having a same priority, the processor obtains, with respect to each of the plurality of executable partial processes having the same priority, at least one of:
a first number that is the number of partial processes which depend on a corresponding executable partial process, which become executable after execution of the corresponding partial process is completed, and which have the same priority as the corresponding partial process has,
a second number that is the number of partial processes which depend on the corresponding partial process, which do not become executable after the execution of the corresponding partial process is completed, and which have the same priority as the corresponding partial process has,
a third number that is the number of partial processes which depend on the corresponding partial process, which become executable after the execution of the corresponding partial process is completed, and which have priorities lower than a priority of the corresponding partial process, and
a fourth number that is the number of partial processes which depend on the corresponding partial process, which do not become executable after the execution of the corresponding partial process is completed, and which have priorities lower than the priority of the corresponding partial process, and
the processor executes a partial process having a largest number as the first number, the second number, the third number, or the fourth number obtained, among the plurality of executable partial processes having the same priority.

14. The image processing apparatus according to claim 13, wherein
the processor obtains the first numbers, the second numbers, the third numbers, and the fourth numbers, in the order of the first numbers, the second numbers, the third numbers, and the fourth numbers, for the plurality of executable partial processes having the same priority, and,
when the numbers obtained as the first numbers, the second numbers, the third numbers, or the fourth numbers are different for the plurality of individual partial processes having the same priorities, the processor executes a partial process having the largest number of the numbers obtained.

15. The image processing apparatus according to claim 1, wherein,
in a case where there is a plurality of executable partial processes having a same priority, the processor determines a difference, for each of the plurality of executable partial processes, between the memory amount in an output area required for execution of a corresponding partial process and memory amount in an input area to be released after the execution of the corresponding partial process is completed, and executes a partial process of which the difference determined is minimum among the differences determined for the plurality of executable partial processes.

16. The image processing apparatus according to claim 1, wherein,
in a case where there is a plurality of executable partial processes having a same priority, the processor obtains, with respect to each of the plurality of executable partial processes having the same priority, at least one of:
a first number that is the number of partial processes which depend on a corresponding executable partial process, which become executable after execution of the corresponding partial process is completed, and which have the same priority as the corresponding partial process has,
a second number that is the number of partial processes which depend on the corresponding partial process, which do not become executable after the execution of the corresponding partial process is completed, and which have the same priority as the corresponding partial process has,
a third number that is the number of partial processes which depend on the corresponding partial process, which become executable after the execution of the corresponding partial process is completed, and which have priorities lower than a priority of the corresponding partial process, and
a fourth number that is the number of partial processes which depend on the corresponding partial process, which do not become executable after the execution of the corresponding partial process is completed, and which have priorities lower than the priority of the corresponding partial process, and
the processor is configured to select whether to use
a first method of executing a partial process having a largest number as the first number, the second number, the third number, or the fourth number obtained, among the plurality of executable partial processes having the same priority,
a second method of determining a difference, for each of the plurality of executable partial processes, between the memory amount in an output area required for execution of a corresponding partial process and memory amount in an input area to be released after the execution of the corresponding partial process is completed, and executing a partial process of which the difference determined is minimum among the differences determined for the plurality of executable partial processes, or
a combination of the first method and the second method.

17. An image processing method which is performed by an image processing apparatus for executing partial processes on each of a plurality of image-section data items, corresponding to a plurality of image sections obtained by dividing an input image into partial regions, in each object of an object group in which a plurality of objects for executing image processing is connected to one another in a directed acyclic graph form, the image processing method comprising:
assigning dependency relationships to the partial processes between objects that are connected in the plurality of objects;
assigning a priority to a partial process of an object arranged in a terminal stage of the object group;

assigning, as a priority of a partial process of an object arranged at a pre-stage side which has at least one partial process that is connected at a post-stage side and that has the dependency relationship assigned, a largest value of the priority assigned to the at least one partial process that is connected at the post-stage side and that has the dependency relationship assigned; and executing a partial process having become executable according to the dependency relationship, according to the priority assigned.

18. A non-transitory computer-readable medium storing a program causing a computer to execute a process for executing partial processes on each of a plurality of image-section data items, corresponding to a plurality of image sections obtained by dividing an input image into partial regions, in each object of an object group in which a plurality of objects for executing image processing is connected to one another in a directed acyclic graph form, the process comprising:

assigning dependency relationships to the partial processes between objects that are connected in the plurality of objects;

assigning a priority to a partial process of an object arranged in a terminal stage of the object group;

assigning, as a priority of a partial process of an object arranged at a pre-stage side which has at least one partial process that is connected at a post-stage side and that has the dependency relationship assigned, a largest value of the priority assigned to the at least one partial process that is connected at the post-stage side and that has the dependency relationship assigned; and executing a partial process having become executable according to the dependency relationship, according to the priority assigned.

* * * * *